United States Patent
Jung et al.

(10) Patent No.: US 7,773,875 B2
(45) Date of Patent: Aug. 10, 2010

(54) AUTO-FOCUSING CAMERA MODULE HAVING LIQUID LENS

(75) Inventors: Moon Sik Jung, Gyunggi-do (KR); Tae Young Kim, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 271 days.

(21) Appl. No.: 12/149,104

(22) Filed: Apr. 25, 2008

(65) Prior Publication Data

US 2008/0267603 A1 Oct. 30, 2008

(30) Foreign Application Priority Data

Apr. 26, 2007 (KR) .................. 10-2007-0040874

(51) Int. Cl.
G03B 3/00 (2006.01)
G02B 1/06 (2006.01)
G02B 3/14 (2006.01)

(52) U.S. Cl. .................. 396/129; 396/111; 396/535; 359/666

(58) Field of Classification Search ............ 396/111, 396/129, 535; 359/665–666
See application file for complete search history.

(56) References Cited

U.S. PATENT DOCUMENTS

| | | | |
|---|---|---|---|
| 5,559,571 A | 9/1996 | Miyamoto et al. | |
| 7,126,903 B2 | 10/2006 | Feenstra et al. | |
| 7,573,646 B2 * | 8/2009 | Craen et al. | 359/665 |
| 2006/0193064 A1* | 8/2006 | Kim | 359/811 |
| 2008/0165427 A1* | 7/2008 | Tseng et al. | 359/666 |

FOREIGN PATENT DOCUMENTS

| | | |
|---|---|---|
| JP | 7-218802 | 8/1995 |
| JP | 2000-347154 | 12/2000 |
| JP | 2005-518052 | 6/2005 |
| JP | 2006-91259 | 4/2006 |
| JP | 2006-133413 | 5/2006 |

(Continued)

OTHER PUBLICATIONS

Japanese Office Action mailed Nov. 24, 2009 in corresponding Japanese Patent Application 2008-115909.

(Continued)

*Primary Examiner*—W. B. Perkey
*Assistant Examiner*—Dennis Hancock

(57) ABSTRACT

Provided is an auto-focusing camera module having a liquid lens. The auto-focusing camera module includes a lens barrel having a liquid lens and a solid lens stacked and disposed therewith; an image sensor for focusing light that is passed through the liquid lens and the solid lens; a substrate provided in a lower end of the lens barrel to electrically mount the image sensor; and a power supply unit fixed integrally in the lens barrel and electrically coupled between the liquid lens and the substrate to apply a power source to the liquid lens. Therefore, the auto-focusing camera module may be useful to control its focus to coincide with high pixels and high performances of the camera module, manufacture a small final product by lowering the entire height of the camera module, enhancing the productivity of the camera module by employing a simple liquid lens to simplify an assembly structure of the liquid lens that is in contact with the substrate, and reduce the manufacturing cost.

36 Claims, 20 Drawing Sheets

FOREIGN PATENT DOCUMENTS

| | | |
|---|---|---|
| JP | 2006-243711 | 9/2006 |
| JP | 2006-252725 | 9/2006 |
| JP | 2007-72108 | 3/2007 |
| JP | 2007-163749 | 6/2007 |
| KR | 10-2006-0129325 | 12/2006 |
| WO | 2007/043508 A1 | 4/2007 |

OTHER PUBLICATIONS

English Translation of the Japanese Office Action issued Nov. 24, 2009 in corresponding Japanese Patent Application 2008-115909.

Japanese Decision of Rejection dated May 18, 2010 and issued in corresponding Japanese Patent Application 2008-115909.

* cited by examiner

AUTO-FOCUSING CAMERA MODULE HAVING LIQUID LENS

CROSS-REFERENCE TO RELATED APPLICATIONS

This application claims the priority of Korean Patent Application No. 2007-40874 filed on Apr. 26, 2007, in the Korean Intellectual Property Office, the disclosure of which is incorporated herein by reference.

BACKGROUND OF THE INVENTION

1. Field of the Invention

The present invention relates to a camera module having a liquid lens, and more particularly, to an auto-focusing camera module having a liquid lens capable of automatically controlling focusing of the liquid lens.

2. Description of the Related Art

In general, personal communication services (PCS) such as mobile phones, PDA, portable PC have been increasingly used to transmit image data as well as character or voice data.

With these recent trends, a camera module is basically installed in the personal communication service (PCS) to facilitate the image data transmissions or video chats, etc.

FIG. 1 is a longitudinal cross-sectional view illustrating a conventional camera module. The camera module 1 includes a lens barrel 10 having a plurality of lenses 2 disposed in an inner space thereof; a male screw unit 11 formed in an outer surface of the body; and an incidence hole 13 formed through in an upper central region thereof.

The lens barrel 10 moves up and down in an optical axis direction relative to a housing 20 as a fixing member in rotation of the lens barrel 10 by engaging with the housing 20 having a female screw unit 21 formed in an inner surface thereof.

An image sensor 30 is disposed in a lower end of the housing 20, the image sensor 30 being provided with an image focusing region in which an image of a subject passed through the lens is focused, and the image sensor 30 is electrically connected to an upper or lower surface of a substrate 40.

Here, it is shown that the image sensor 30 is mounted in the upper surface of the substrate 40 by means of a plurality of wire members 35 using a wire bonding process, but the present invention is not particularly limited thereto. Also, the image sensor 30 may be mounted in the lower surface of the substrate using a flip-chip bonding process.

In FIG. 1, a reference numeral 15 represent a spacer for maintaining a distance between the lens 2 and an adjacent lens, a reference numeral 16 represent an iris for controlling light intensity through the incidence hole 13, a reference numeral 17 represents a press-fit ring for press-fitting the lens 2 into a lower end of the lens barrel 10 to fix the lens 2 in the lens barrel 10.

For the conventional camera module 1, the lens barrel 10 coupled to the housing 20 by screws should move in a forward direction or a reverse direction to control a focal distance between the image sensor 30 and the lens 2 provided in the lens barrel.

However, the camera module 1 has problems that it has a complicated structure in which the lens barrel and the housing are coupled by the screw, poor products are manufactured with a relatively higher level after its complete assembly, and an operation of adjusting a lens focus is carried out by hand in its assembly line, and therefore the manufacturing cost is high.

Also, it is problematic to manufacture a small product since there is one limit to reduce a height of the product due to a screw joint structure between the lens barrel and the housing.

Meanwhile, Japanese Patent Publication No. 2006-243572 (published on Sep. 14, 2006) discloses a camera module in which a liquid lens and a solid lens are disposed to adjust a lens focus Here, the liquid lens has a configuration in which its cavity having a predetermined capacity is filled with a dielectric fluid, its upper portion is filled with an electrolyte solution, and electrodes are formed in a lower portion of the dielectric fluid. In this configuration, when an electric current flows in the electrodes and the electrolyte solution, the substances that are in contact with the liquids may be soaked with the liquids due to the change in surface tension of the liquids (so-called, an electro-wetting phenomenon). Therefore, the electro-wetting phenomenon results in the change in an interfacial angle, for example a contact angle, of the dielectric electrolyte fluid.

As described above, the liquid lens is used to easily control its focus without its mechanical driving using the electro-wetting phenomenon since a curvature of the interface is changed by the equilibrium wetting condition in the interface.

However, in order to apply an electric current to the liquid lens in the conventional camera module, a flexible printed circuit (FPC) that is electrically coupled to the electrodes and the electrolyte solution is positioned and fixed by the filler with which the upper portion of the lens barrel is filled, and then drawn out. Then, an input of the FPC should be electrically coupled to a power supply unit (not shown).

In this case, it is very cumbersome to dispose and fix the FPC in the lens barrel using the filler with which the upper portion of the lens barrel is filled, and the exposed FPC may be short or damaged by the interference with the other members in mounting the assembled camera module in a main substrate.

Also, it was difficult to simplify an assembly structure of the liquid lens and reduce the manufacturing cost since the liquid lens into which the FPC is assembled should be assembled into the camera module.

SUMMARY OF THE INVENTION

The present invention is designed to solve the problems of the prior art, and therefore it is an object of the present invention to provide an auto-focusing camera module having a liquid lens capable of manufacturing small final products by controlling its focus to coincide with high pixels and high performances and lowering its entire height, enhancing its productivity by employing a simple liquid lens and simplifying an assembly structure of the liquid lens, and reducing the manufacturing cost.

According to an aspect of the present invention, there is provided an auto-focusing camera module having a liquid lens including a lens barrel having a liquid lens and a solid lens stacked and disposed therewith; an image sensor for focusing light that is passed through the liquid lens and the solid lens; a substrate provided in a lower end of the lens barrel to electrically mount the image sensor; and a power supply unit fixed integrally in the lens barrel and electrically coupled between the liquid lens and the substrate to apply a power source to the liquid lens.

In this case, the power supply unit may include first and second leads whose upper ends are disposed adjacent and electrically coupled to the liquid lens, the upper end being exposed through an inner surface of the lens barrel, and whose lower ends are electrically coupled to the substrate, the lower end being exposed to the outside of the lens barrel.

Also, the upper end of the first lead may be in contact with a base constituting the liquid lens and the lower end of the first lead may be in contact with the substrate, and the upper end of the second lead may be in contact with a lower transparent substrate that is coupled to a lower surface of the base and the lower end of the second lead may be in contact with the substrate.

In addition, each of the first and second leads may include a vertical body formed integrally to the lens barrel, and an elastic contact unit obliquely bended toward the liquid lens to be in elastic contact with the liquid lens.

Additionally, the elastic contact units of the first and second leads may be disposed respectively in first and second exposure regions formed in the inner surface of the lens barrel.

Furthermore, the lower ends of the first and second leads may be in contact with terminal connecting units of the substrate by means of solders.

Also, the lower ends of the first and second leads may be in contact with the terminal connecting units of the substrate by means of connectors that is provided in the terminal connecting units of the substrate.

In addition, the lens barrel may include a first receptor unit having the liquid lens disposed therein, and a second receptor unit having the solid lens disposed therein.

Furthermore, the upper end of the lens barrel may be provided with an upper cap having an incidence hole formed therethrough.

According to another aspect of the present invention, there is provided an auto-focusing camera module having a liquid lens including a lens barrel having a liquid lens and a solid lens stacked and disposed therewith; an image sensor for focusing light that is passed through the liquid lens and the solid lens; a substrate provided in a lower end of the lens barrel to electrically mount the image sensor; and a power supply unit inserted and disposed in an array hole passed vertically through a body of the lens barrel and electrically coupled between the liquid lens and the substrate to apply a power source to the liquid lens.

In this case, the power supply unit may include first and second leads whose upper ends are disposed adjacent and electrically coupled to an outer surface of the liquid lens, the upper end being partially exposed through an inner surface of the lens barrel, and whose lower ends are electrically coupled to the substrate, the lower end being exposed to the outside of the lens barrel.

Also, the upper end of the first lead may be in contact with an upper surface of a base constituting the liquid lens and the lower end of the first lead may be in contact with the substrate, and the upper end of the second lead may be in contact with a lower surface of a lower transparent substrate that may be coupled to a lower surface of the base and the lower end of the second lead is in contact with the substrate.

In addition, each of the first and second leads may include a vertical body inserted and disposed in the array hold, and a horizontal body bended at an angle of 90° from the upper end of the vertical body toward the liquid lens to be in contact with an outer surface of the liquid lens.

Additionally, the array hole may be coupled to a lead array groove concavely formed in the inner surface of the lens barrel.

Furthermore, the horizontal body of the first lead may be stacked and disposed between the liquid lens and an upper cap assembled into the lens barrel.

Also, the horizontal body of the first lead may include a throughhole having a higher size than the upper transparent substrate constituting the liquid lens.

In addition, the horizontal body of the second lead may be stacked and disposed between the liquid lens and the solid lens.

Additionally, the horizontal body of the second lead may include a throughhole having a higher size than effective diameters of the liquid lens and the solid lens.

Also, the lower ends of the first and second leads may be in contact with terminal connecting units of the substrate by means of solders.

In addition, the lower ends of the first and second leads may be in contact with the terminal connecting units of the substrate by means of connectors that are provided in an upper surface of the substrate.

Additionally, the lens barrel may include a first receptor unit having the liquid lens disposed therein, and a second receptor unit having the solid lens disposed therein.

Furthermore, the upper end of the lens barrel may be provided with an upper cap having an incidence hole formed therethrough.

According to still another aspect of the present invention, there is provided an auto-focusing camera module having a liquid lens including a lens barrel having a liquid lens and a solid lens stacked and disposed therewith; an image sensor for focusing light that is passed through the liquid lens and the solid lens; a substrate provided in a lower end of the lens barrel to electrically mount the image sensor; and a power supply unit inserted and disposed in an array hole passed vertically through a body of the lens barrel, foldedly disposed between the liquid lens and the solid lens, and electrically coupled between the liquid lens and the substrate to apply a power source to the liquid lens.

In this case, the power supply unit may include a flexible substrate whose outer surface is provided with first and second connection patterns, the outer surface being in opposing contact with the liquid lens, and whose lower end is electrically coupled to the substrate, the lower end being exposed to the outside of the lens barrel through the array hole.

Also, the flexible substrate may include a first substrate having a first connection pattern printed therein, the first connection pattern being in contact with the base constituting the liquid lens; a second flexible substrate having a second connection pattern printed therein, the second connection pattern being in contact with the lower transparent substrate constituting the base; and a third flexible substrate having a third connection pattern printed therein, the third connection pattern being electrically coupled to the substrate, wherein the first, second and third connection patterns is coupled through circuit lines printed on the flexible substrate.

In addition, a first connecting flexible substrate is provided between the first flexible substrate and the second flexible substrate, the first connecting flexible substrate being disposed in the substrate array groove concavely formed in the inner surface of the lens barrel, and second connecting flexible substrate is provided between the second flexible substrate and the third flexible substrate, the second connecting flexible substrate being inserted and disposed in another array hole formed through the lens barrel.

Additionally, the array hole in which the second connecting flexible substrate is inserted and disposed may be coupled to another substrate array groove concavely formed in the inner surface of the lens barrel.

Furthermore, the first flexible substrate may be stacked and disposed between an upper surface of the base and the upper cap assembled onto the lens barrel.

Also, the second flexible substrate may be stacked and disposed between the solid lens and a lower surface of the lower transparent substrate provided in the base.

In addition, the first flexible substrate and the second flexible substrate may have the same size as an inner diameter of the lens barrel.

Additionally, the first flexible substrate may include a throughhole having a higher size than the upper transparent substrate constituting the liquid lens.

Also, the second flexible substrate may include a throughhole having a higher size than effective diameters of the liquid lens and the solid lens.

In addition, the first flexible substrate may be stacked and disposed between the inner surface of the lens barrel and the outer surface of the base.

Additionally, the first substrate may be disposed in the substrate array groove formed in the inner surface of the lens barrel.

Also, the third connection pattern of the third flexible substrate may be in contact with the terminal connecting unit of the substrate by means of a solder.

In addition, the third connection pattern of the third flexible substrate may be in contact with the terminal connecting unit of the substrate by means of a connector provided in the terminal connecting unit of the substrate.

Additionally, the lens barrel may include a first receptor unit having the liquid lens disposed therein, and a second receptor unit having the solid lens disposed therein.

Furthermore, the upper end of the lens barrel is provided with an upper cap having an incidence hole formed therethrough.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Embodiment 1

Figure 1:
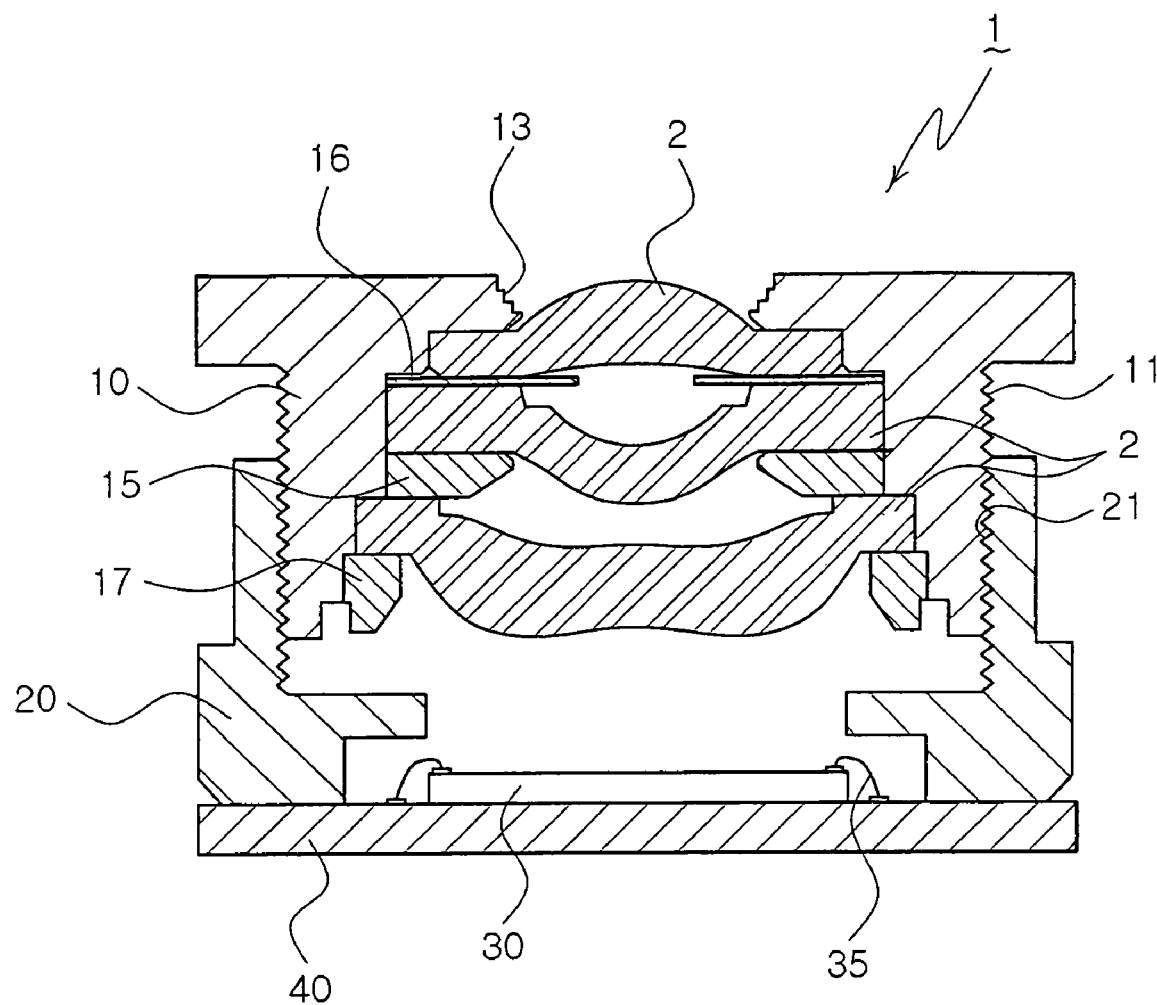
FIG. 1 is a longitudinal cross-sectional view illustrating a conventional camera module.
Figure 2:
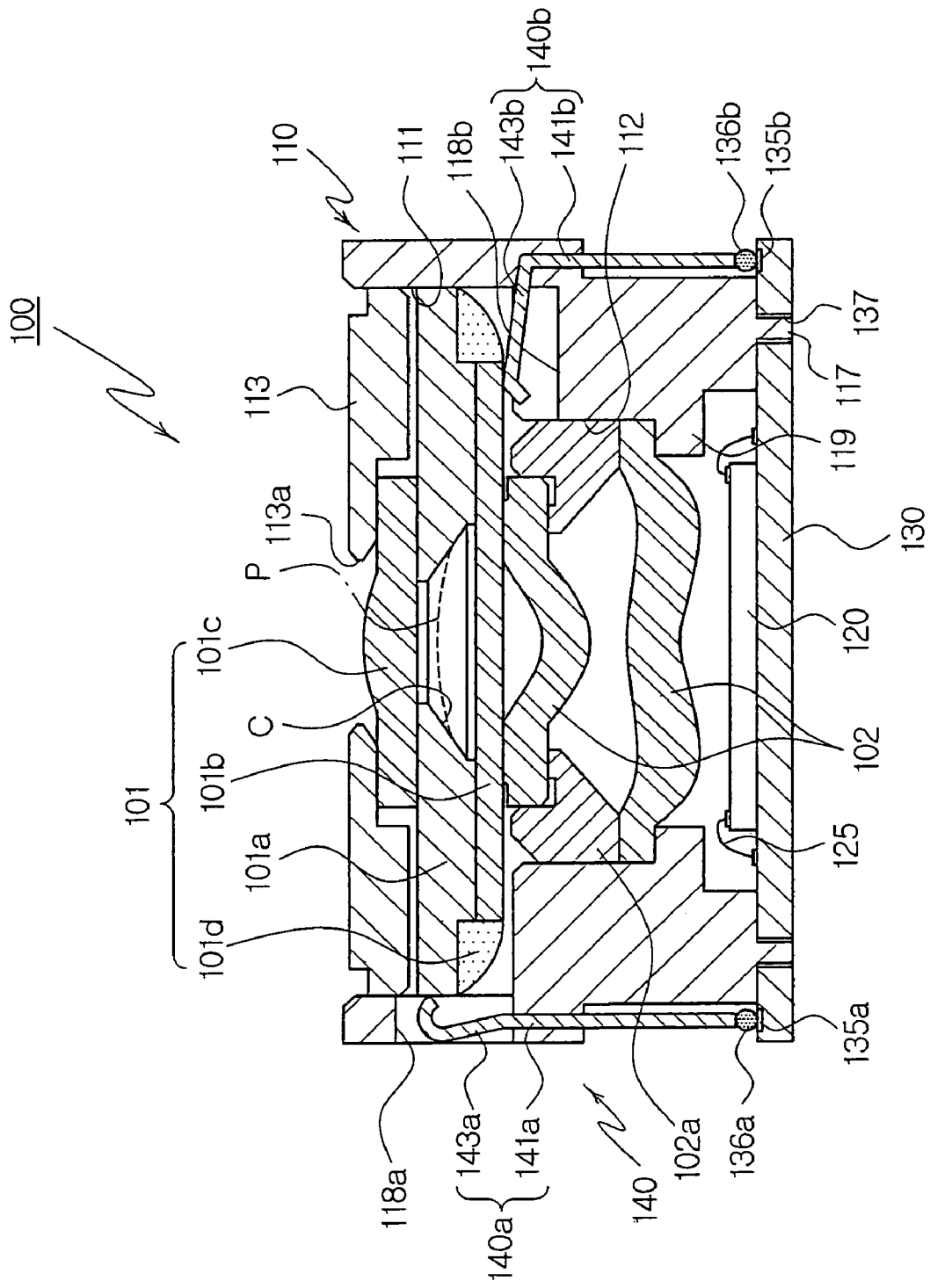
FIG. 2 is a longitudinal cross-sectional view illustrating an auto-focusing camera module having a liquid lens according to one exemplary embodiment of the present invention.

FIG. 2 is a longitudinal cross-sectional view illustrating an auto-focusing camera module having a liquid lens according to one exemplary embodiment of the present invention. Here, the camera module 100 according to the one exemplary embodiment of the present invention includes a lens barrel 110, an image sensor 120, a substrate 130 and a power supply unit 140.

The lens barrel 110 is a hollow cylindrical lens receptor unit having at least one liquid lens 101 disposed therein, and a solid lens 102 disposed as an optical lens therein, the liquid lens 101 functioning to change a curvature of an interface due to the electro-wetting phenomenon in application of a power source and the solid lens 102 being composed of plastics or glasses.

Such a lens barrel 110 includes a first receptor unit 111 having the liquid lens disposed therein, and a second receptor unit 112 having the solid lens disposed therein, both of which are disposed so that the liquid lens and the solid lens can be disposed respectively in upper and lower ends of the first and second receptor units 111 and 112.

The liquid lens 101 disposed in the first receptor unit 111 includes a base 101a formed in the center of a body thereof and formed through an inner space, cavity (C), having a predetermined capacity; an upper transparent substrate 101c stacked and disposed in an upper surface of the base to seal an upper portion of the cavity; and a lower transparent substrate 101b stacked in a lower surface of the base to seal a lower portion of the cavity.

Here, the liquid lens 101 preferably has the substantially same external diameter as an inner diameter of the first receptor unit 111 so that the liquid lens 101 can be inserted and disposed in the first receptor unit 111 without its moving left and right relative to the first receptor unit 111.

The cavity (C) of the base 101a is filled with an electrolyte solution and a dielectric fluid, both of which have the substantially same density, so that the electrolyte solution and the dielectric fluid can be stacked, as a non-conductive fluid and a conductive fluid, up and down relative to each other, respectively. Also, an interface (P) having a curvature with a predetermined value is formed between the electrolyte solution and the dielectric fluid.

The lower transparent substrate 101b is bonded to a lower surface of the base 101a using a bonding agent 101d, and an electrode layer such as ITO is formed in an outer surface of the lower transparent substrate 101b to apply an electric current to an electrolyte solution with which the cavity is filled.

An upper cap 113 is assembled into an upper end of the lens barrel 110, the upper cap 113 being formed in a central region of the upper surface of the lens barrel 110 and having an incidence hole 113a with a predetermined diameter formed therethrough.

In this case, when the upper cap 113 is assembled into the upper end of the lens barrel 110, some lower surface of the upper cap 113 is circumscribed about an upper surface of the base 101a constituting the liquid lens, or about an upper surface of the upper transparent substrate 101c, and therefore the liquid lens 101 is pressed to prevent separation of the liquid lens disposed in the first receptor unit 111.

And, a lower surface of the lower transparent substrate 101b constituting the liquid lens 101 is in close contact with a flat portion of the solid lens disposed in the top layer out of a plurality of solid lenses 102, and therefore the solid lens 102 is pressed right down to prevent separation of the solid lens disposed in the second receptor unit 112.

The solid lens 102 disposed in the second receptor unit 112 is held and anchored in a protrusion 119 protruded from an inner surface of the second receptor unit 112, and includes a spacer 102a to maintain a constant distance between the solid lenses, the spacer 102a being formed between the solid lens 102 and its another adjacent solid lens.

The second receptor unit 112 may further include an iris (not shown) to control intensity of light passed through the solid lens 102, or further include a filter member (not shown) for filtering ultraviolet rays of the light.

The image sensor 120 is a sensor member having an image focusing region formed in an upper surface thereof, the image focusing region being disposed right below the solid lens 102 to focus the light passed through the liquid lens 101 and the solid lens 102.

In the present invention, it is shown that the image sensor 120 is electrically mounted on the substrate 130 that is coupled and fixed in a lower end of the lens barrel 110, and the image sensor 120 mounted on the substrate 130 is bonded to a pattern circuit, which is formed in the substrate 130, through a plurality of wires 125, but the present invention is not particularly limited thereto. Also, the image sensor 120 may be mounted on a lower surface of the substrate 130 using a flip-chip bonding process, the substrate 130 having a window with a predetermined size formed therethrough.

Meanwhile, the power supply unit 140 is electrically coupled between the liquid lens 101 and the substrate 140 so that the power supply unit 140 can be fixed integrally in the lens barrel 110 to apply a power source to the liquid lens 101. The power supply unit 140 includes a first lead 140a and a second lead 140b, both of which are made of a conductive metal to selectively provide an anode and a cathode.

Since upper ends of the first lead 140a and the second lead 140b are exposed through the inner surface of the lens barrel 110 corresponding to the liquid lens 101, the first lead 140a and the second lead 140b are electrically coupled to the liquid lens through the contact with the outer surface of the liquid lens 101.

Also, since lower ends of the first lead 140a and the second lead 140b are exposed to the outside of the lens barrel 110 corresponding to the substrate 130, the first lead 140a and the second lead 140b are electrically coupled to the substrate 130.

That is to say, the upper end of the first lead 140a is electrically coupled to the liquid lens through the contact with an outer surface of the base 101a constituting the liquid lens 101, and the lower end of the first lead 140a is coupled to a terminal connecting unit 135a formed in an upper surface of the substrate 130.

The upper end of the second lead 140b is electrically coupled to the liquid lens through the contact with the lower transparent substrate 101b that is in contact with the lower surface of the base 101a, and the lower end of the second lead 140b is coupled to the other terminal connecting unit 135b formed in an upper surface of the substrate 130.

Here, it is shown that the lower ends of the first lead 140a and the second lead 140b are electrically coupled respectively to the terminal connecting units 135a and 135b as power supplying terminals by means of the solders 136a and 136b, but the present invention is not particularly limited thereto.

The lower ends of the first lead 140a and the second lead 140b have connectors (not shown) formed on the terminal connecting units 135a and 135b of the substrate 130, respectively. Therefore, the first lead 140a and the second lead 140b may be electrically coupled to the terminal connecting units 135a and 135b of the substrate 130 in more easy and fast manner in the assembly of the lens barrel 110 and the substrate 130.

Accordingly, the first lead 140a, the liquid lens 101 and the second lead 140b have a series of circuits in which an electric current flows in one direction in application of a power source.

Figure 3:
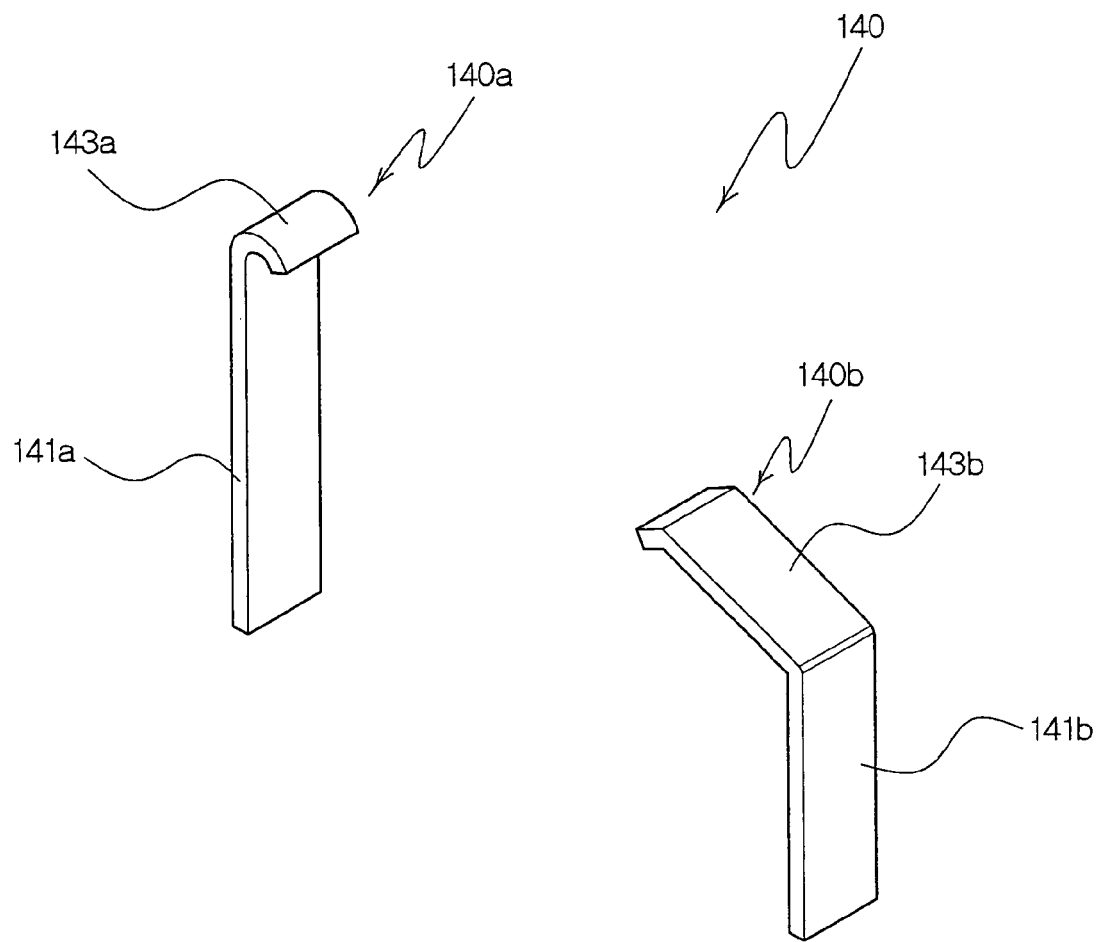
FIG. 3 is a perspective view illustrating a power supply unit used in the auto-focusing camera module having a liquid lens according to the one exemplary embodiment of the present invention.

Also, the first lead 140a includes a vertical body 141a and an elastic contact unit 143a, as shown in FIGS. 2 and 3. Here, since the vertical body 141a is formed integrally in the lens barrel 110 in forming the lens barrel 110 made of resins, a mid-length region of the vertical body 141a is fixed in the lens barrel 110, and upper and lower ends of the vertical body 141a are exposed to the outside environment, and the elastic contact unit 143a functions to generate an elastic force with a predetermined energy since it is obliquely bent toward the base 101a so that it can be in elastic contact with the base 101a of the liquid lens 101.

Like the first lead 140a, the second lead 140b includes a vertical body 141b and an elastic contact unit 143b. Here, since the vertical body 141b is formed integrally in the lens barrel 110 in forming the lens barrel 110, a mid-length region of the vertical body 141b is fixed in the lens barrel 110, and upper and lower ends of the vertical body 141b is exposed to the outside environment, and the elastic contact unit 143b functions to generate an elastic force with a predetermined energy since it is obliquely bent toward the liquid lens 101 so that it can be in elastic contact with a lower surface of the lower transparent substrate 101b of the liquid lens 101.

Also, the inner surface of the lens barrel 110 that corresponds to the liquid lens 101 is provided with first and second exposure regions 118a and 118b to ensure a space that may be easily elastically modified when the elastic contact units 143a and 143b provided in the upper ends of the first and second leads 140a and 140b are in contact with the liquid lens inserted and disposed in the first receptor unit of the lens barrel 110.

The first exposure region 118a is formed through an inner surface of the first receptor unit 111 corresponding to the base 101a of the liquid lens 101, or concavely formed at a predetermined depth in an outer surface of the first receptor unit 111.

The second exposure region 118b is concavely formed at a predetermined depth in an inner surface of the second receptor unit 112 corresponding to the lower transparent substrate 101b of the liquid lens 101.

Figure 4A:
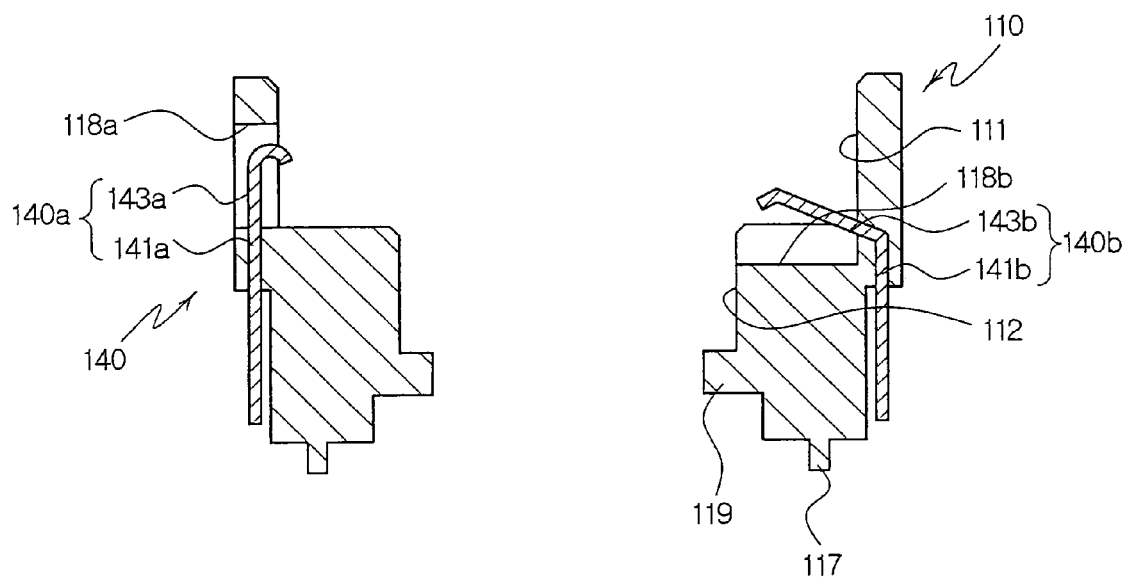
FIGS. 4A, B, C and D are assembly views illustrating operations of assembling the auto-focusing camera module having a liquid lens according to the one exemplary embodiment of the present invention.

As shown in FIG. 4A, an operation of assembling the camera module 100 as configured thus includes: preparing a lens barrel 110 including first and second lens receptor units 111 and 112 and forming a first lead 140a and a second lead 140b, both of which constitute the power supply unit 140, integrally in the lens barrel 110.

The first and second leads 140a and 140b may be insert-injected to be fixed in the lens barrel 110 during the injection molding of the lens barrel 110, but the present invention is not particularly limited thereto. Also, the first and second leads may be fixed integrally in the lens barrel by forming lead array grooves (not shown) in a body of the lens barrel, disposing first and second leads 140a and 140b on the lead array grooves, and fusing the lead array grooves, which are made of resin, using a laser or ultrasonic waves.

In this case, the vertical bodies 141a and 141b constituting the first and second leads 140a and 140b are fixed integrally in the lens barrel 110, whereas the elastic contact units 143a and 143b are exposed while being protruded toward the first receptor unit 111 since the elastic contact units 143a and 143b are disposed in the first and second exposure regions 118a and 118b that are formed in the injection molding of the lens barrel 110.

Figure 4B:
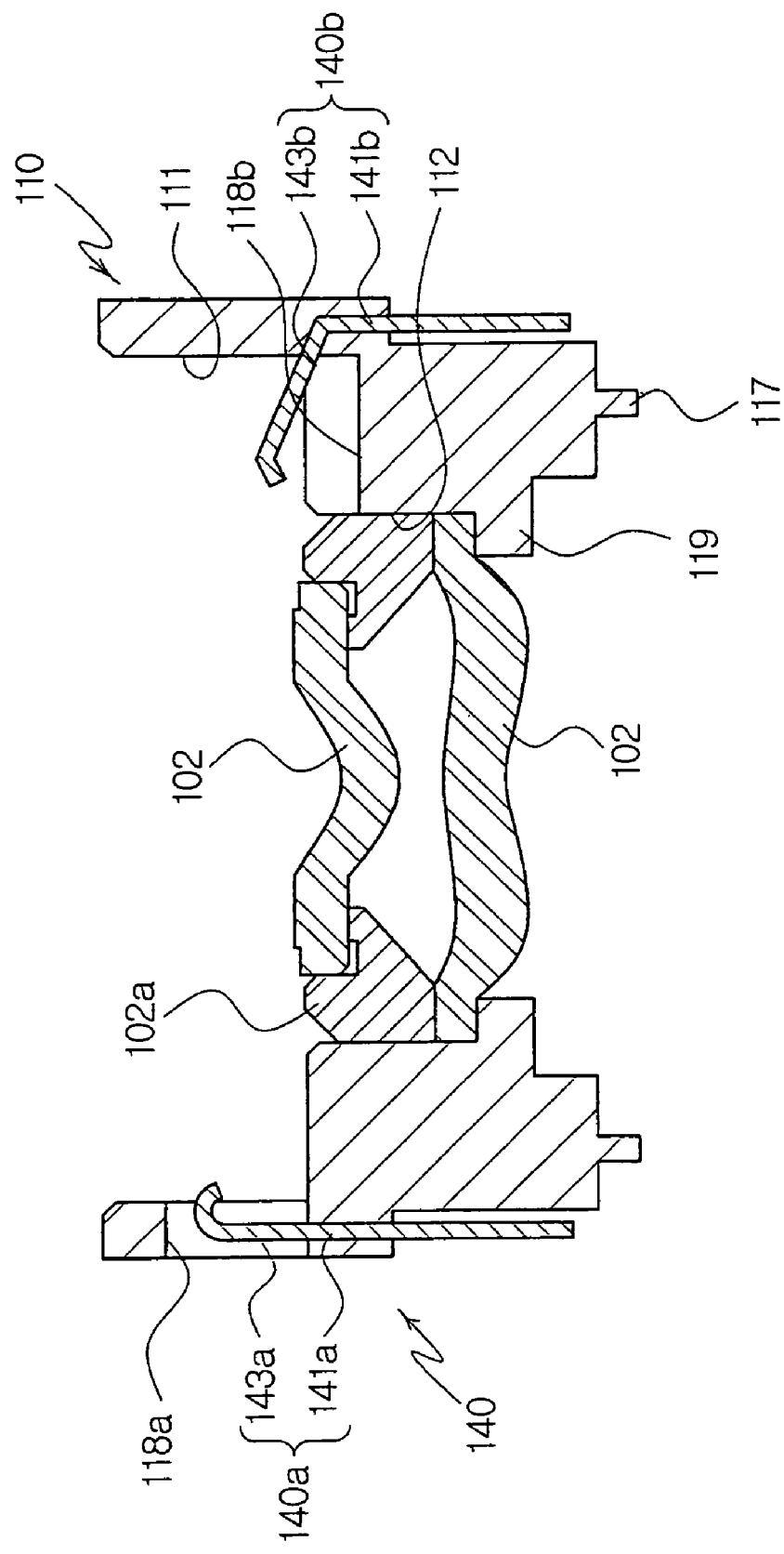

Also, an operation of disposing a solid lens 102 in the lens barrel 110 is carried out by inserting and disposing a plurality of solid lenses 102 in the lens barrel 110 in an optical axis direction, as shown in FIG. 4B. Therefore, the bottom solid lens 102 is fixed in a protrusion 119 protruded from an inner surface of the second lens receptor unit 112 with a flat portion of the bottom solid lens 102 being in contact with the protrusion 119, and the other solid lenses adjacent to the solid lens are stacked and disposed by means of a spacer 102a.

In this case, it is shown that two solid lenses are disposed in a lens barrel in the case of the auto-focusing camera module according to the one exemplary embodiment of the present invention, but the present invention is not particularly limited thereto. Therefore, one or three or more solid lenses may be disposed in the lens barrel according to the design of the imaging optical system.

Also, the second lens receptor unit may further include an iris for controlling intensity of light and a filter member for filtering ultraviolet rays of the light.

Figure 4C:
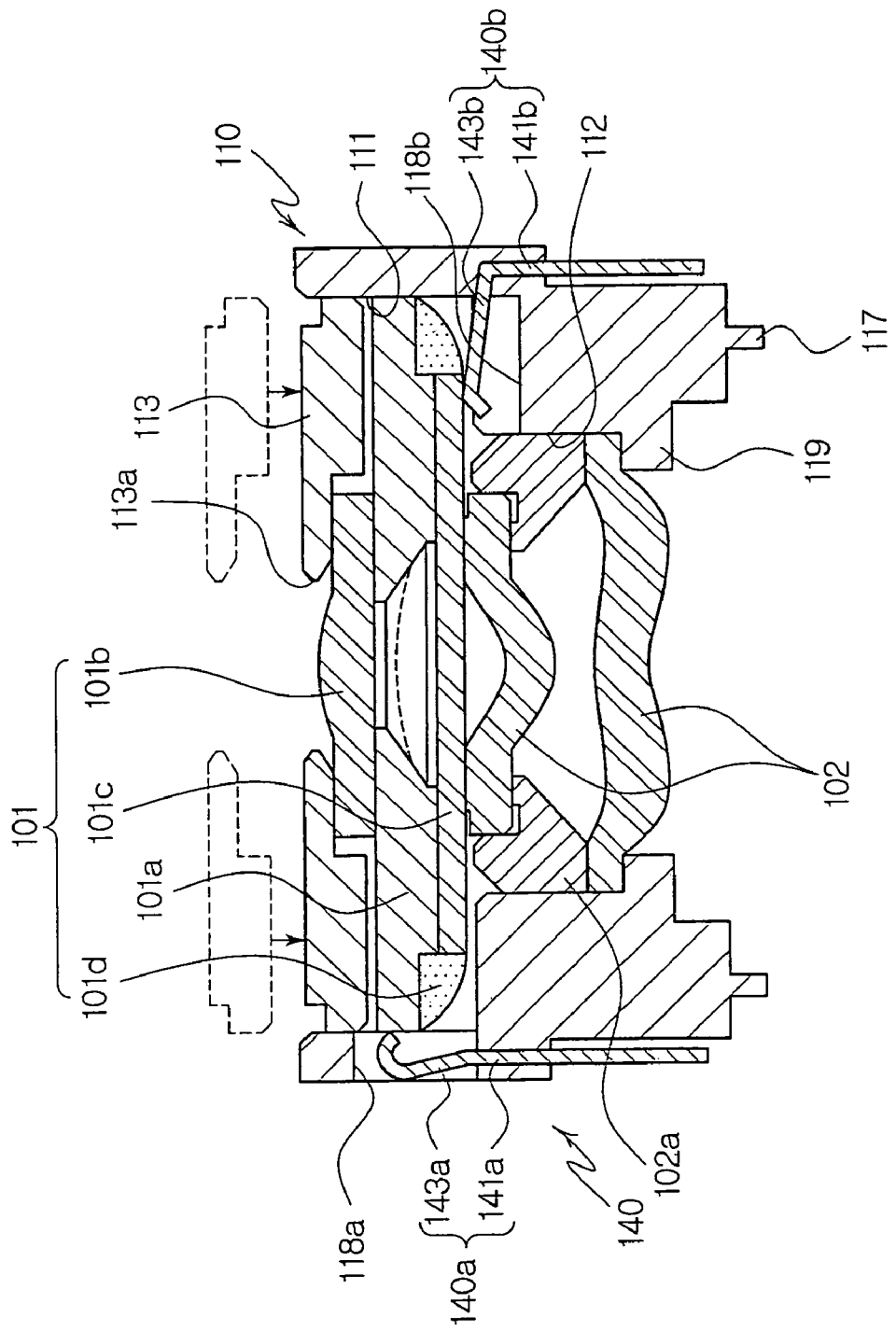

Subsequently, an operation of disposing a liquid lens 101 in the lens barrel 110 is carried out by inserting a liquid lens 101 into the lens barrel 110 and stacking and disposing the liquid lens 101 in the first lens receptor unit 111, the liquid lens 101 including a base 101a and upper and lower transparent substrates 101c and 101b and a cavity (C) of the base 101a being filled with an electrolyte solution and a dielectric fluid, as shown in FIG. 4C.

In this case, while the liquid lens 101 is inserted into the first lens receptor unit 111 of the lens barrel 110, the elastic contact unit 143a of the first lead 140a is elastically modified while being unaffectedly pushed out with the elastic contact unit 143a being in contact with an outer surface of the base 101a, and the elastic contact unit 143b of the second lead 140b is elastically modified while being unaffectedly pushed down with the elastic contact unit 143b being in contact with a lower surface of the lower transparent substrate 101b.

Also, when the lower transparent substrate 101b is in contact with the top solid lens 102, the insertion of the liquid lens 101 is suspended, and the elastic contact units 143a and 143b of the first and second leads 140a and 140b simultaneously maintain the contact between the base 101 and the lower transparent substrate 101b using the elastic recovery that is caused from the interference with the liquid lens 101.

Subsequently, the separation of the liquid lens 101 inserted and disposed in the first lens receptor unit 111 of the lens barrel 110 is prevented by assembling and fixing an upper cap 113 in an upper portion of the lens barrel 110, the upper cap 113 being formed in a central region of the lens barrel 110 and having an incidence hole 113a formed therethrough.

Here, after the upper cap 113 is inserted into an upper inner surface of the lens barrel 110, the upper cap 113 may be fixed in the lens barrel 110 using a bonding agent that is applied between an inner surface of the lens barrel 110 and an outer surface of the upper cap 113, and the upper cap 113 and the lens barrel 110 may be coupled to each other by means of a screw by forming a male screw unit in an outer surface of the upper cap 113 and forming a female screw unit in an inner surface of the lens barrel 110.

Figure 4D:
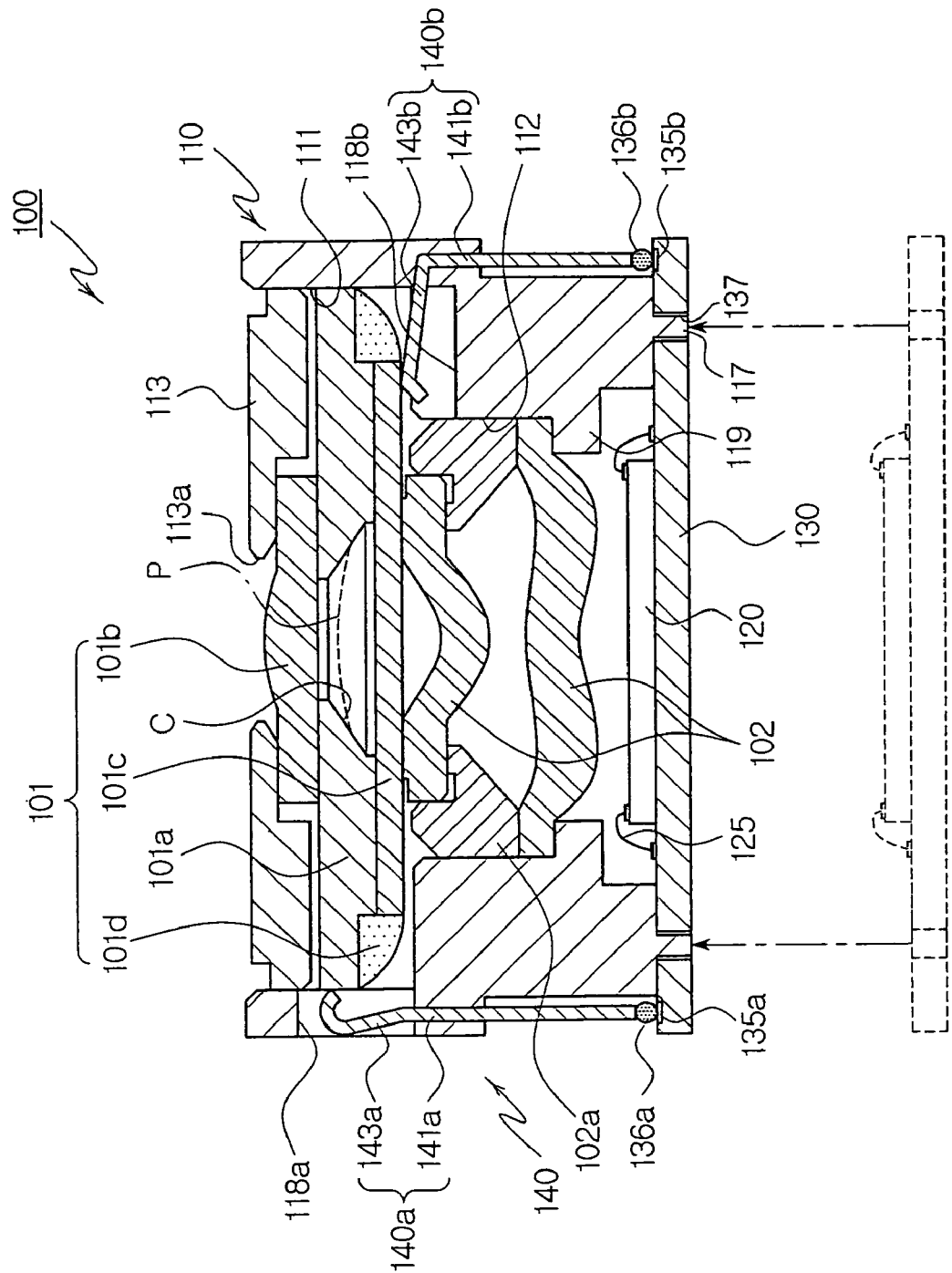

In addition, an operation of assembling the lens barrel 110 and the substrate 130 is carried out by inserting a position fixing pin 117 formed in a lower end of the lens barrel into a position fixing hole 137 formed in the substrate 130 when the lens barrel 110 in which the liquid lens 101 and the solid lens 102 are disposed is used as an upper part and the substrate 130 in which an image sensor 120 is mounted is used as a lower part, and the lens barrel 110 and the substrate 130 are disposed up and down relative to each other, as shown in FIG. 4D.

In this case, the vertical bodies 141a and 141b of the first and second leads 140a and 140b that are extended along an outer surface of the lens barrel 110 correspond respectively to the terminal connecting units 135a and 135b formed in an upper surface of the substrate 130.

Therefore, the lower ends of the vertical bodies 141a and 141b are electrically coupled respectively to the terminal connecting units 135a and 135b by means of the solders 136a and 136b, or electrically coupled respectively to the terminal connecting units 135a and 135b by means of connectors (not shown) formed in the terminal connecting units 135a and 135b.

And, the lens barrel 110 and the substrate 130 are assembled up and down relative to each other by bonding the lower end of the lens barrel 110 to the upper surface of the substrate 130 by means of a bonding agent that is coated onto an outer rim of the substrate 130, and therefore the assembly of the auto-focusing camera module 100 is completed.

Embodiment 2

Figure 5:
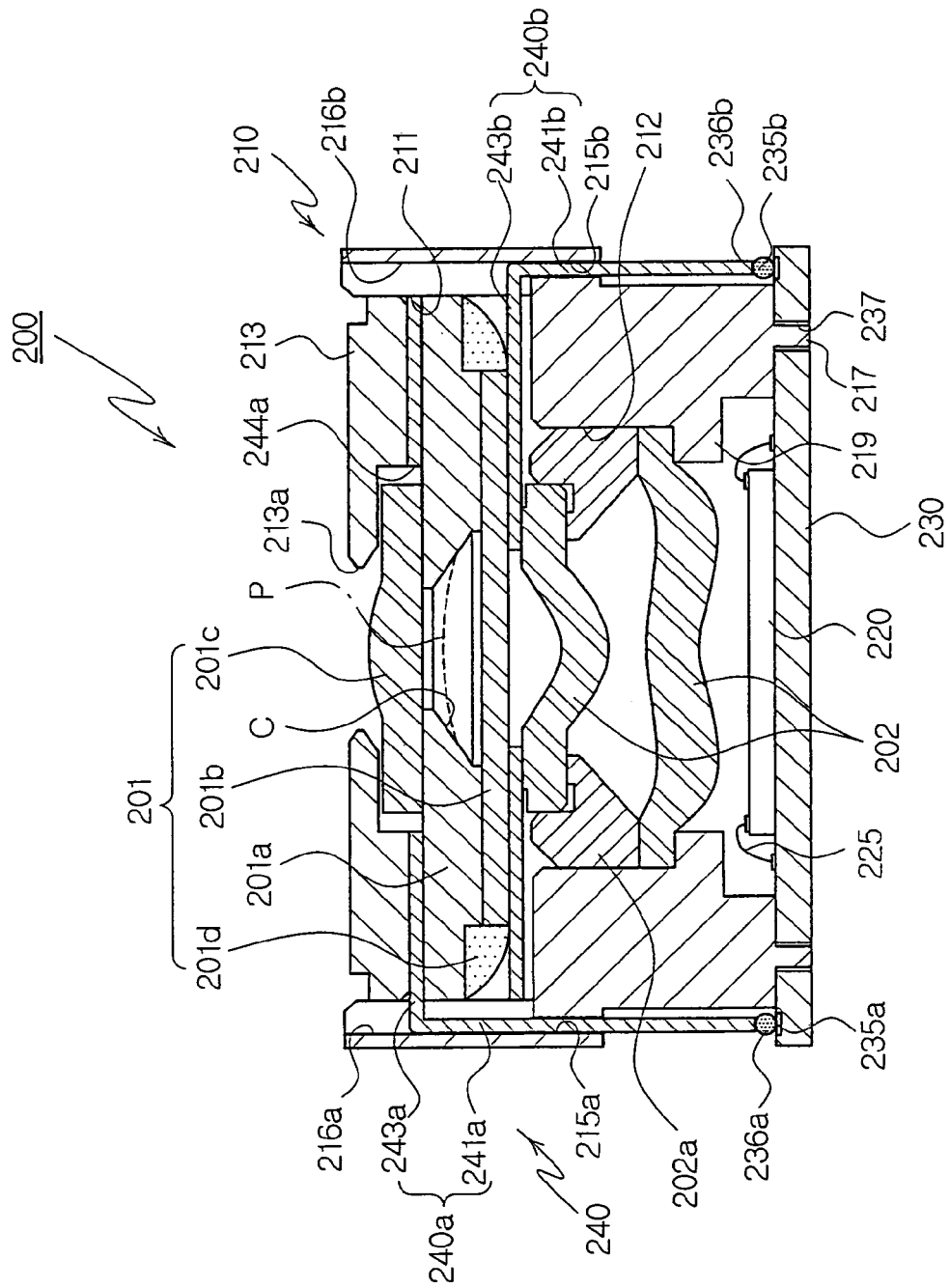
FIG. 5 is a longitudinal cross-sectional view illustrating an auto-focusing camera module having a liquid lens according to another exemplary embodiment of the present invention.

FIG. 5 is a longitudinal cross-sectional view illustrating an auto-focusing camera module having a liquid lens according to another exemplary embodiment of the present invention. Here, the camera module 200 according to another exemplary embodiment of the present invention includes a lens barrel 210, an image sensor 220, a substrate 230 and a power supply unit 240.

Reference numerals of the lens barrel 210, the image sensor 220 and the substrate 230 are represented by two hundreds since they have the same configurations as those of the one exemplary embodiment, and their detailed descriptions are omitted for clarity.

The power supply units 240 are inserted and fixed into array holes 215a and 215b formed vertically through a body of the lens barrel 210, and electrically coupled between the liquid lens 201 and the substrate 230 to apply a power source to a liquid lens 201.

The power supply unit 240 includes a first lead 240a and a second lead 240b, both of which are made of a conductive metal to selectively provide an anode and a cathode.

Since upper ends of the first lead 240a and the second lead 240b are partially exposed to an inner space of the lens barrel 210, the first lead 240a and the second lead 240b are electrically coupled to the liquid lens 201 through the contact with an outer surface of the liquid lens 201.

Also, since lower ends of the first lead 240a and the second lead 240b are exposed to the outside of the lens barrel 210 corresponding to the substrate 230, the first lead 240a and the second lead 240b are electrically coupled to the substrate 230.

That is to say, the upper end of the first lead 240a is stacked and disposed between the liquid lens 201 and an upper cap 213 so that it can be electrically coupled to the liquid lens 201 through the contact with an upper surface of the base 101a constituting the liquid lens 201, and the lower end of the first lead 240a is also in contact with a terminal connecting unit 235a formed in an upper surface of the substrate 230.

The upper end of the second lead 240b is electrically coupled to the liquid lens through the contact with a lower surface of a lower transparent substrate 201b that is in contact with the lower surface of the base 101a, and the lower end of the second lead 240b is coupled to the other terminal connecting unit 235b formed in an upper surface of the substrate 230.

Here, it is shown that the lower ends of the first lead 240a and the second lead 240b are electrically coupled respectively to the terminal connecting units 235a and 235b as power supplying terminals by means of solders 236a and 236b, or electrically coupled respectively to the terminal connecting units 235a and 235b by means of connectors (not shown) provided in the terminal connecting units 235a and 235b of the substrate 230.

Therefore, the first lead 240a, the liquid lens 201 and the second lead 240b have a series of circuits in which an electric current flows in one direction in application of a power source.

Figure 6:
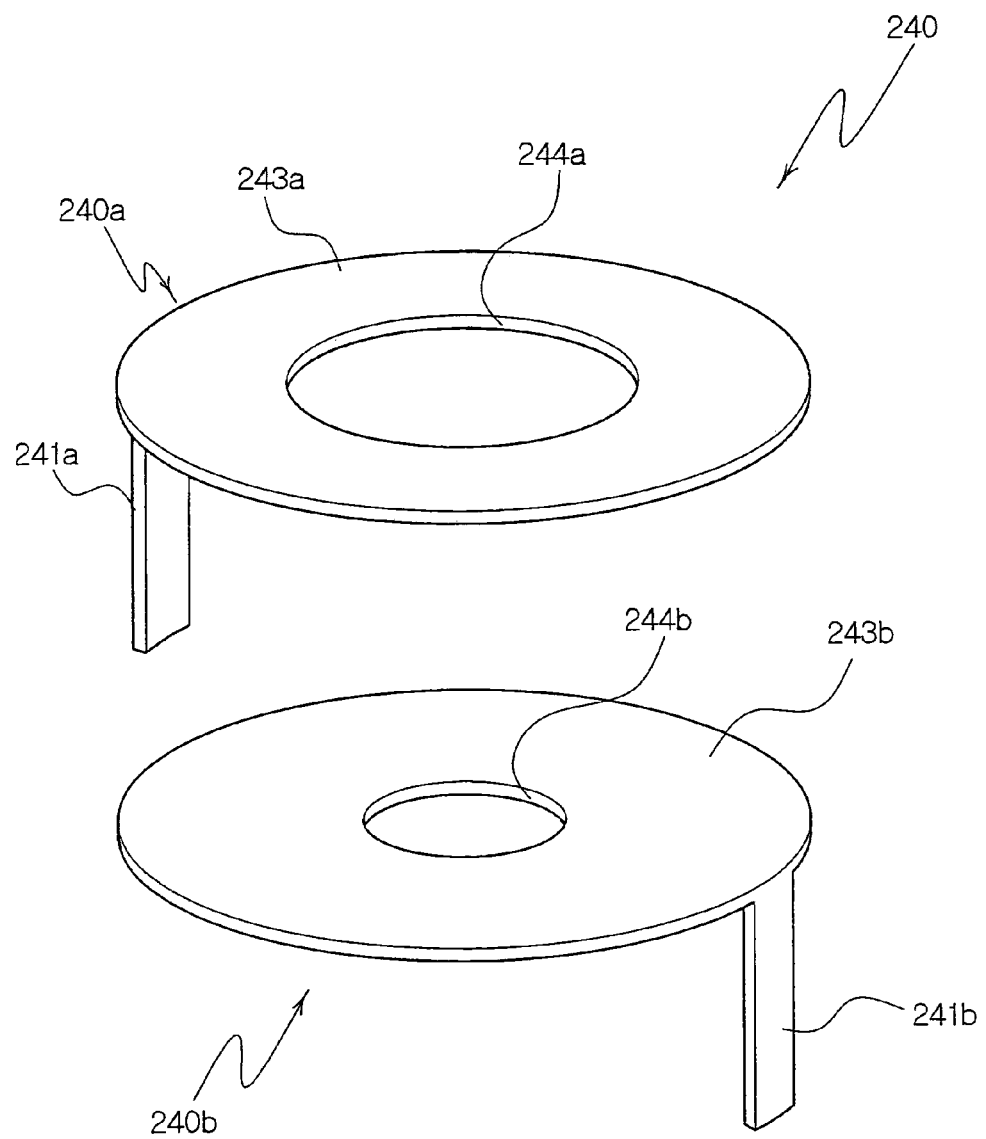
FIG. 6 is a perspective view illustrating a power supply unit used in the auto-focusing camera module having a liquid lens according to the another exemplary embodiment of the present invention.

Also, the first lead 240a includes a vertical body 241a and a horizontal body 243a, as shown in FIGS. 5 and 6. Here, the vertical body 241a is inserted and disposed into an array hole 215a formed vertically through the body of the lens barrel 210 in forming the lens barrel 210 made of resins, and a lower end of the vertical body 241a is exposed to the outside environment, and the horizontal body 243a is bended at an angle of 90° from the upper end of the vertical body 241a to be in contact with a base 201a of the liquid lens 201.

Like the first lead 240a, the second lead 240b includes a vertical body 241b and a horizontal body 243b. Here, the vertical body 141b is inserted and disposed into another array hole 215b formed vertically through the body of the lens barrel 210 in forming the lens barrel 210, and a lower end of the vertical body 241b is exposed to the outside environment, and the horizontal body 243b is bended at an angle of 90° from the upper end of the vertical body 241b to be in contact with a lower surface of a lower transparent substrate 201b of the liquid lens 201.

Here, a horizontal body 243a of the first lead 240a is stacked and disposed between the upper cap 213 and the liquid lens 201, and a horizontal body 243b of the second lead 240b is stacked and disposed between the liquid lens 201 and the solid lens 202.

Also, the horizontal body 243a of the first lead 240a is formed through in a central region of a throughhole 244a having a higher size than an external diameter of an upper transparent substrate 201c of the liquid lens 201, and the horizontal body 243b of the second lead 240b has a throughhole 244b formed therethrough, the throughhole 244b having a higher size than effective diameters of the liquid lens 201 and the solid lens 202.

The centers of the throughholes 244a and 244b preferably coincide with an optical axis that is passed through the centers of the liquid lens 201 and the solid lens 202.

Also, lead array grooves 216a and 216b are provided respectively in an inner surface of the lens barrel 220 corresponding respectively to the vertical bodies 243a and 243b of the first and second leads 240a and 240b, the lead array grooves 216a and 216b being coupled to array holes 215a and 215b into which the vertical bodies 243a and 243b are inserted to prevent the vertical bodies 243a and 243b from freely moving left and right while guiding the first and second leads 240a and 240b to be inserted into the array holes 215a and 215b.

Figure 7A:
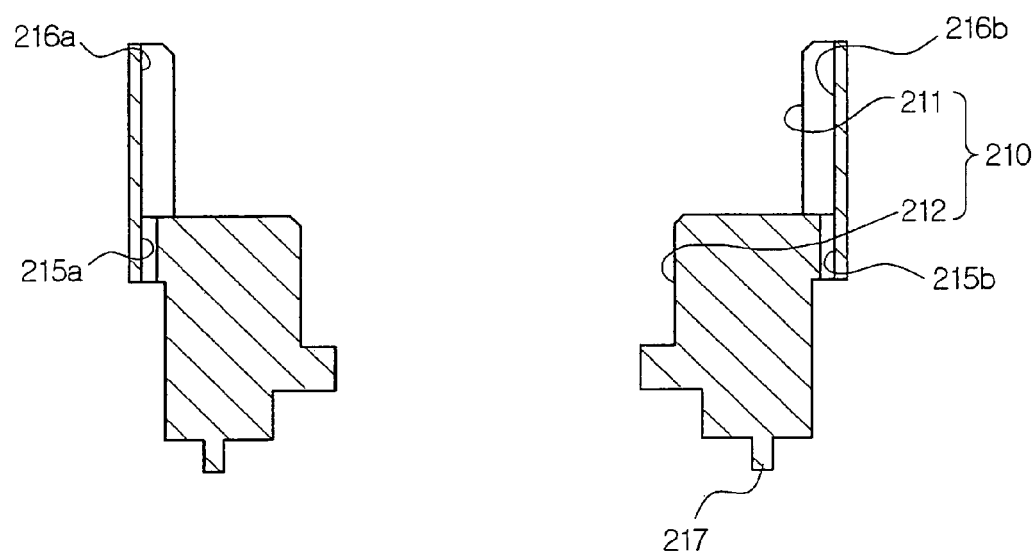
FIGS. 7A, B, C and D are assembly views illustrating operations of assembling the auto-focusing camera module having a liquid lens according to the another exemplary embodiment of the present invention.

As shown in FIG. 7A, an operation of assembling the camera module 200 as configured thus includes: preparing a lens barrel 210 including first and second lens receptor units 211 and 212 and forming array holes 215a and 215b and lead array grooves 216a and 216b in the lens barrel 210.

The array holes 215a and 215b and the lead array grooves 216a and 216b are formed in the lens barrel 210 during the injection molding of the lens barrel 210.

Figure 7B:
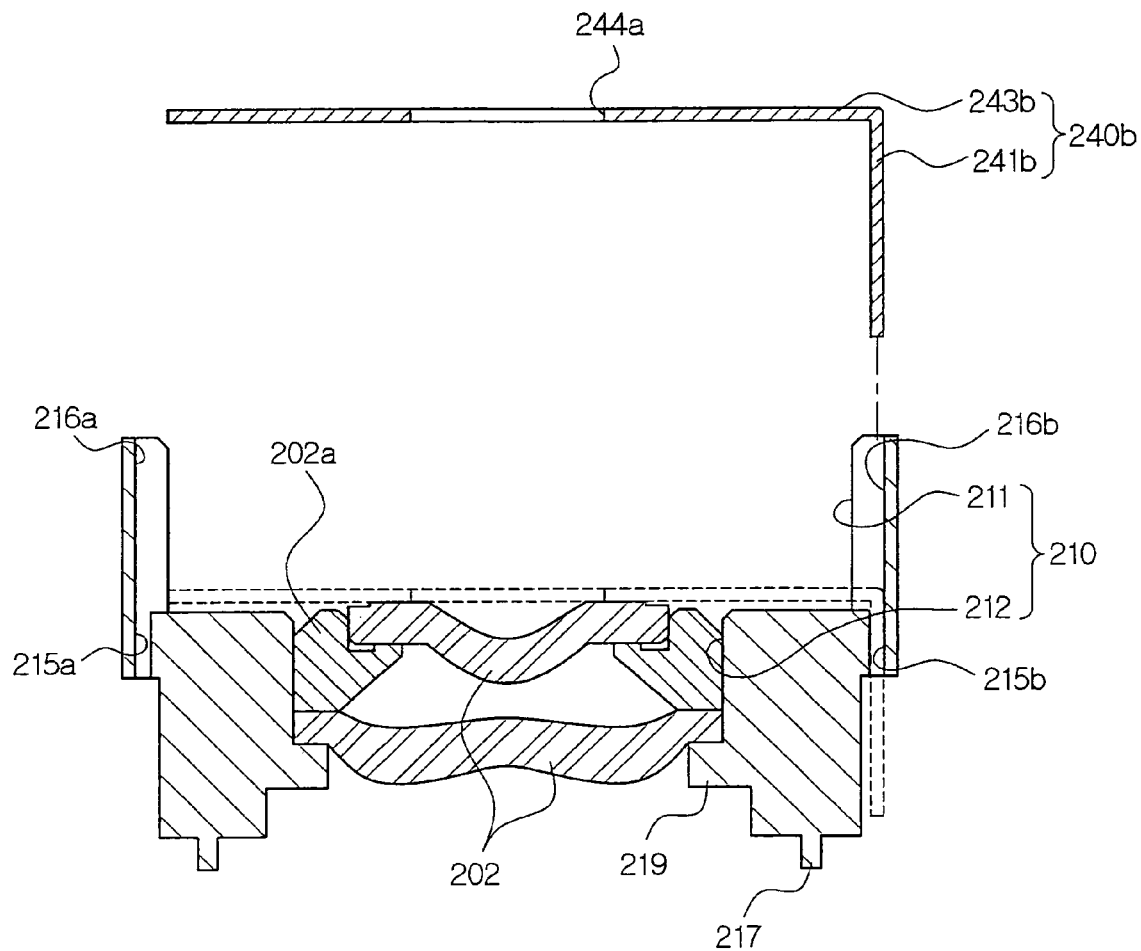

Also, an operation of disposing a solid lens 202 in the lens barrel 210 is carried out by inserting and disposing a plurality of solid lenses 202 in the lens barrel 210 in an optical axis direction, as shown in FIG. 7B. Therefore, the bottom solid lens 202 is fixed in a protrusion 219 protruded from an inner surface of the second lens receptor unit 212 with a flat portion of the bottom solid lens 202 being in contact with the protrusion 219, and the other solid lenses adjacent to the solid lens are stacked and disposed by means of a spacer 202a.

When the solid lens 202 is completely disposed in the second lens receptor unit 212, a second lead 240b composed of a vertical body 241b and a horizontal body 243b is disposed right on the lens barrel 210.

In this case, the vertical body 241b is inserted into the array hole 215b while being guided and inserted along a lead array groove 216b formed in the lens barrel 210, and therefore a lower end of the second lead 240b is exposed to the outside environment, and the horizontal body 243b remaining inside the lens barrel is contact with the top solid lens 202.

Figure 7C:
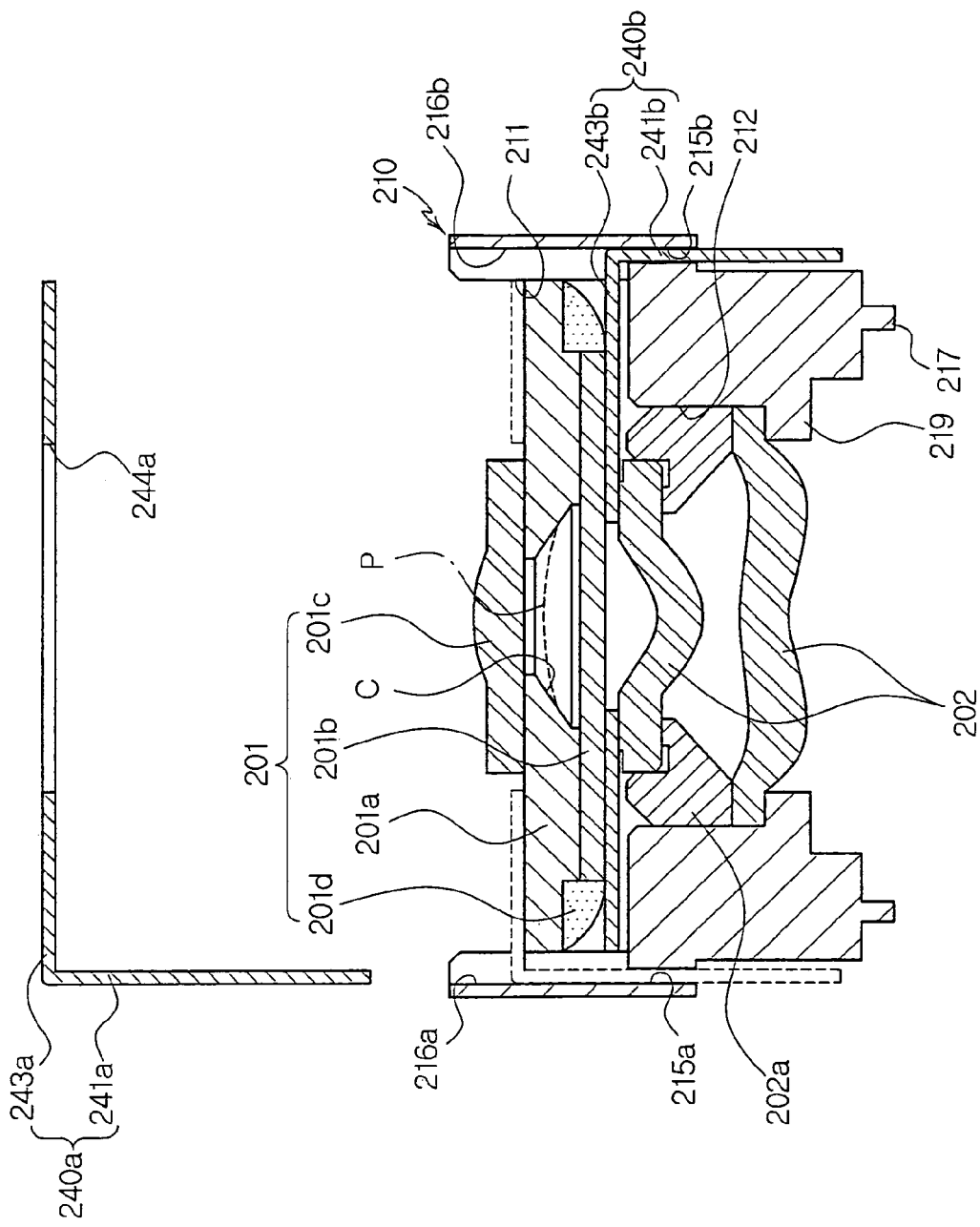

Also, an operation of disposing a liquid lens 201 in the lens barrel 210 is carried out by inserting a liquid lens 201 into the lens barrel 210 and stacking and disposing the liquid lens 201 in the first lens receptor unit 211, the liquid lens 101 including a base 201a and upper and lower transparent substrates 201c and 201b and a cavity (C) of the base 201a being filled with an electrolyte solution and a dielectric fluid, as shown in FIG. 7C.

In this case, the lower transparent substrate 201b of the liquid lens 201 is in contact with the horizontal body 243b of the second lead 240b that is inserted and disposed in the array hole 215a formed in one side of the lens barrel 210, and therefore the horizontal body 243b of the second lead 240b is stacked and disposed between the lower transparent substrate 201b of the liquid lens 201 and the top solid lens 202.

Subsequently, when the liquid lens 201 is completely disposed in the first lens receptor unit 211, a first lead 240a composed of a vertical body 241a and a horizontal body 243a is disposed right on the lens barrel 210, and the vertical body 241a is then inserted into the array hole 215a while being guided and inserted along a lead array groove 216a formed in the lens barrel 210, and therefore a lower end of the first lead 240a is exposed to the outside environment, and the horizontal body 243a remaining inside the lens barrel is contact with an upper surface of the liquid lens 201.

Figure 7D:
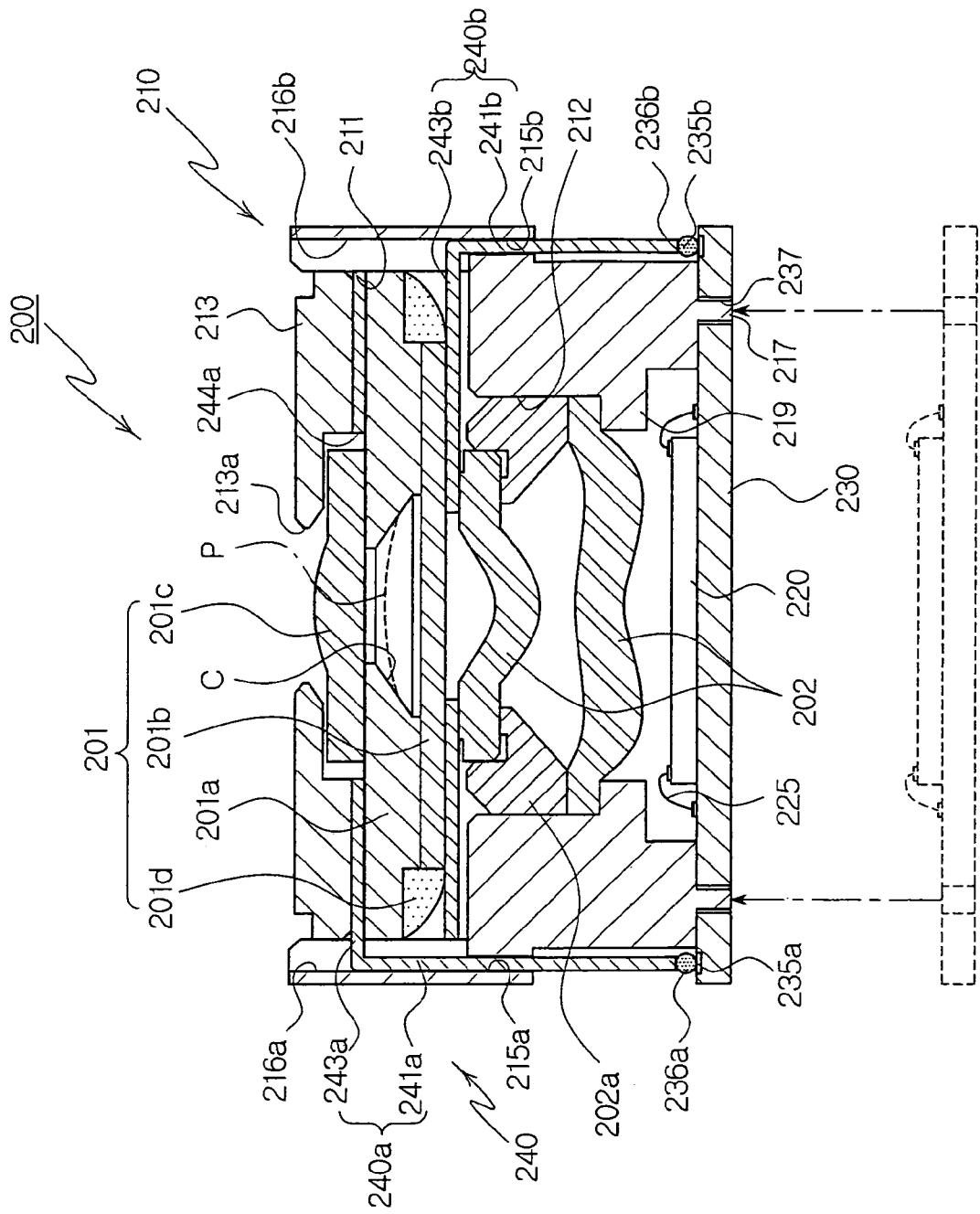

Also, the separation of the liquid lens 201 inserted and disposed in the first lens receptor unit 211 of the lens barrel 210 is prevented by assembling and fixing an upper cap 213 in an upper portion of the lens barrel 210, the upper cap 213 being formed in a central region of the lens barrel 210 and having an incidence hole 213a formed therethrough, as shown in FIG. 7D.

In this case, the horizontal body 243a of the first lead 240a is stacked and disposed between a lower surface of the upper cap 213 and the base 201a of the liquid lens 201.

Subsequently, an operation of assembling the lens barrel 210 and the substrate 230 is carried out by inserting a position fixing pin 217 formed in a lower end of the lens barrel into a position fixing hole 237 formed in the substrate 230 when the lens barrel 210 in which the liquid lens 201 and the solid lens 202 are disposed is used as an upper part and the substrate 230 in which an image sensor 220 is mounted is used as a lower part, and the lens barrel 210 and the substrate 230 are disposed up and down relative to each other.

In this case, the vertical bodies 241a and 241b of the first and second leads 240a and 240b that are extended along an outer surface of the lens barrel 210 correspond respectively to the terminal connecting units 235a and 235b formed in an upper surface of the substrate 230.

Therefore, the lower ends of the vertical bodies 241a and 241b are electrically coupled respectively to the terminal connecting units 235a and 235b by means of the solders 236a and 236b, or electrically coupled respectively to the terminal connecting units 235a and 235b by means of connectors (not shown) formed in the terminal connecting units 235a and 235b.

And, the lens barrel 210 and the substrate 130 are assembled up and down relative to each other by bonding the lower end of the lens barrel 210 to the upper surface of the substrate 230 by means of a bonding agent that is coated onto an outer rim of the substrate 230, and therefore the assembly of the auto-focusing camera module 200 is completed.

Embodiment 3

Figure 8:
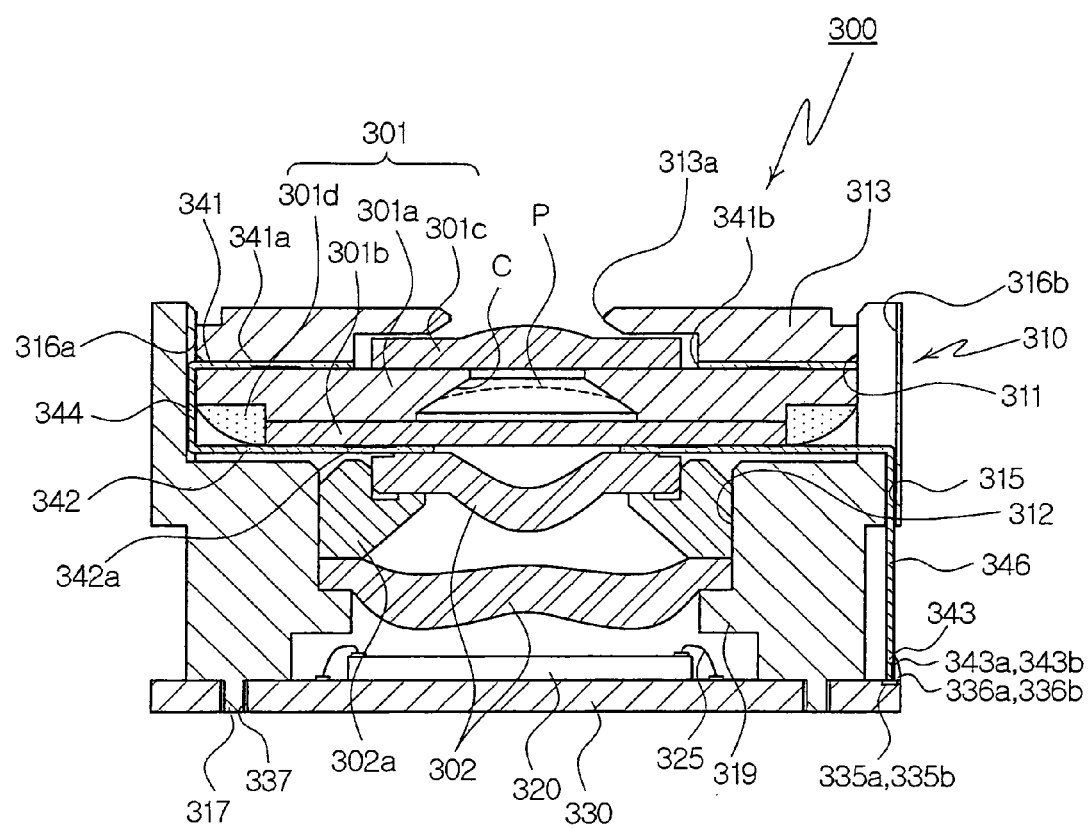
FIG. 8 is a longitudinal cross-sectional view illustrating an auto-focusing camera module having a liquid lens according to still another exemplary embodiment of the present invention.

FIG. 8 is a longitudinal cross-sectional view illustrating an auto-focusing camera module having a liquid lens according to still another exemplary embodiment of the present invention. Here, the camera module 300 according to still another exemplary embodiment of the present invention includes a lens barrel 310, an image sensor 320, a substrate 330 and a power supply unit 340.

Reference numerals of the lens barrel 310, the image sensor 320 and the substrate 330 are represented by three hundreds since they have the same configurations as those of the one and another exemplary embodiment of the present invention, and their detailed descriptions are omitted for clarity.

The power supply unit 340 is inserted and fixed into an array hole 315 formed vertically through a body of the lens barrel 310, and it is foldedly disposed between the liquid lens 301 and the solid lens 302, and thus electrically coupled between the liquid lens 301 and the substrate 330 to apply a power source to a liquid lens 301.

The power supply unit 340 includes a flexible substrate on which first, second and third connection patterns 341a, 342a, 343a and 343b made of a conductive material are printed to selectively provide an anode and a cathode for an outer surface of the power supply unit 340 corresponding to the liquid lens 301.

The flexible substrate is electrically coupled to the liquid lens 301 since an outer surface of the flexible substrate is provided with the first and second connection patterns 341a and 342a, the outer surface being in opposing contact with the liquid lens 301. Also, the flexible substrate is electrically coupled to the substrate 330 since a lower end of the flexible substrate is provided with the third connection patterns 343a and 343b that are exposed to the outside of the lens barrel 310 through the array hole 315.

Figure 10A:
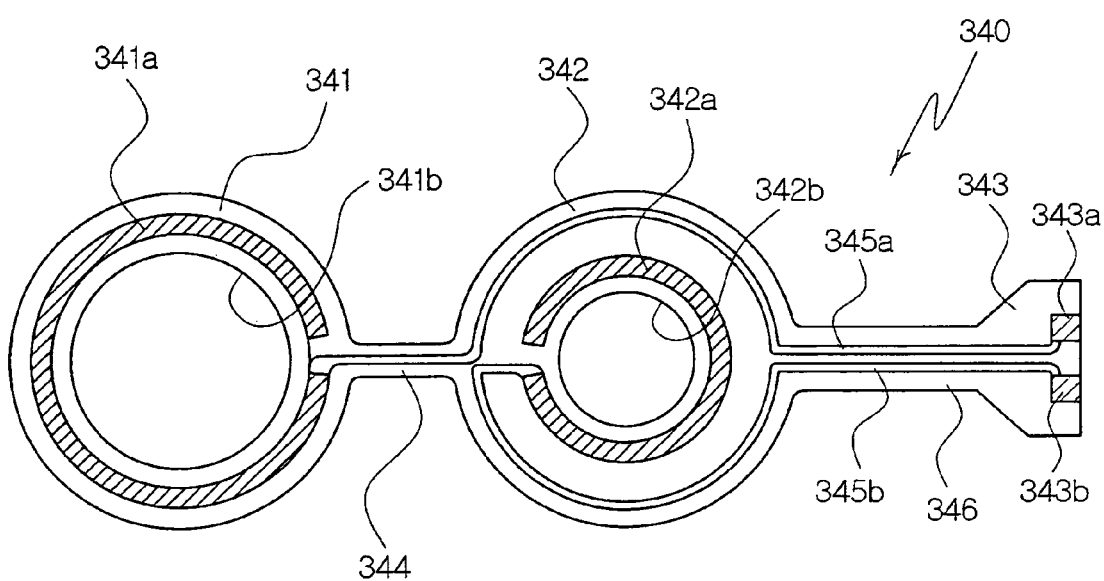
FIGS. 10A and B are perspective views illustrating a power supply unit used in the auto-focusing camera module having a liquid lens according to the sill another and yet another exemplary embodiments of the present invention, respectively.

The flexible substrate includes first, second and third substrates 341, 342 and 343, as shown in FIGS. 8 and 10A. Here, the first substrate 341 has a first connection pattern 341a printed on an outer surface thereof that corresponds the base 301a constituting the liquid lens 301, the second flexible substrate 342 has a second connection pattern 342a printed thereon, the second connection pattern 342a being in contact with a lower transparent substrate 301b constituting the liquid lens 301, and the third flexible substrate 343 has third connection patterns 343a and 343b printed thereon, the third connection patterns 343a and 343b being in contact with terminal connecting units 335a and 335b formed in an upper surface of the substrate 330.

Here, the first connection pattern 341a and the third connection pattern 343a formed in one side of the third flexible substrate 343 are electrically coupled to each other through a circuit line 345a printed on the flexible substrate, and the second connection pattern 342a and the third connection pattern 343b formed in the other side of the third flexible substrate 343 are electrically coupled to each other through another circuit line 345b printed on the flexible substrate.

The first flexible substrate 341 and the second flexible substrate 342 are disposed parallel to each other in a first lens receptor unit 311 of the lens barrel 310, and a first connecting flexible substrate 344 for coupling the first flexible substrate 341 to the second flexible substrate 342 is provided between the first flexible substrate 341 and the second, flexible substrate 342.

The first connecting flexible substrate 344 is disposed in a substrate array groove 316a that is concavely formed at a predetermined depth in an inner surface of the first connecting flexible substrate 344 in the injection molding of the lens barrel 310. Therefore, the flexible substrate prevents the first and second substrates 341 and 342 from moving left and right in the lens barrel 310 by means of the first connecting flexible substrate 344 disposed in the substrate array groove 316a.

Also, the second flexible substrate 342 and the third flexible substrate 343 includes a second connecting flexible substrate 346 that is inserted into an array hole 315 formed through the lens barrel 310 while coupling the second flexible substrate 342 to the third flexible substrate 343.

The second connecting flexible substrate 346 is extended from the array hole 315 in the injection molding of the lens barrel 310, and then disposed in another substrate array groove 316b concavely formed at a predetermined depth in an inner surface of the lens barrel 310. Therefore, the flexible substrate prevents the third flexible substrate 343 from moving left and right by means of the second connecting flexible substrate 346 inserted into the array hole 315 and disposed in the substrate array groove 316b, and maintains its vertically bent state.

The third connection patterns 343a and 343b formed in the third substrate 343 are electrically coupled respectively to terminal connecting units 335a and 335b formed in an upper surface of the substrate 330.

Here, the third connection patterns 343a and 343b are electrically coupled respectively to the terminal connecting units 335a and 335b as power supplying terminals by means of solders 336a and 336b, or electrically coupled respectively to the terminal connecting units 335a and 335b by means of connectors (not shown) provided in the terminal connecting units 335a and 335b.

Therefore, the first, second and third connection patterns 341, 342 and 343 and the liquid lens 301 have a series of circuits in which an electric current flows in one direction in application of a power source.

Also, the first flexible substrate 341 is stacked and disposed between an upper surface of the base 301a and a lower surface of the upper cap 313 assembled onto the lens barrel 310, as shown in FIG. 8. Also, the second flexible substrate 342 is stacked and disposed between the top solid lens and a lower surface of the lower transparent substrate 301b that is in contact with the lower surface of the base 301a.

In this case, the first flexible substrate 341 and the second flexible substrate 342 preferably have the same external diameter as an inner diameter of the first lens receptor unit to prevent the first and second substrates 341 and 342 from moving left and right, the first and second substrates 341 and 342 being disposed in the first lens receptor unit 311 of the lens barrel 310.

The first flexible substrate 341 has a throughhole 341b formed through in a central region thereof, the throughhole 341b having a higher size than an external diameter of the upper transparent substrate 301c of the liquid lens 301, and the second flexible substrate 242 has a throughhole 342b formed therethrough, the throughhole 342b having a higher size than effective diameters of the liquid lens 301 and the solid lens 302.

The centers of the throughholes 341b and 342b preferably coincide with an optical axis that is passed through the centers of the liquid lens 301 and the solid lens 302.

Figure 9:
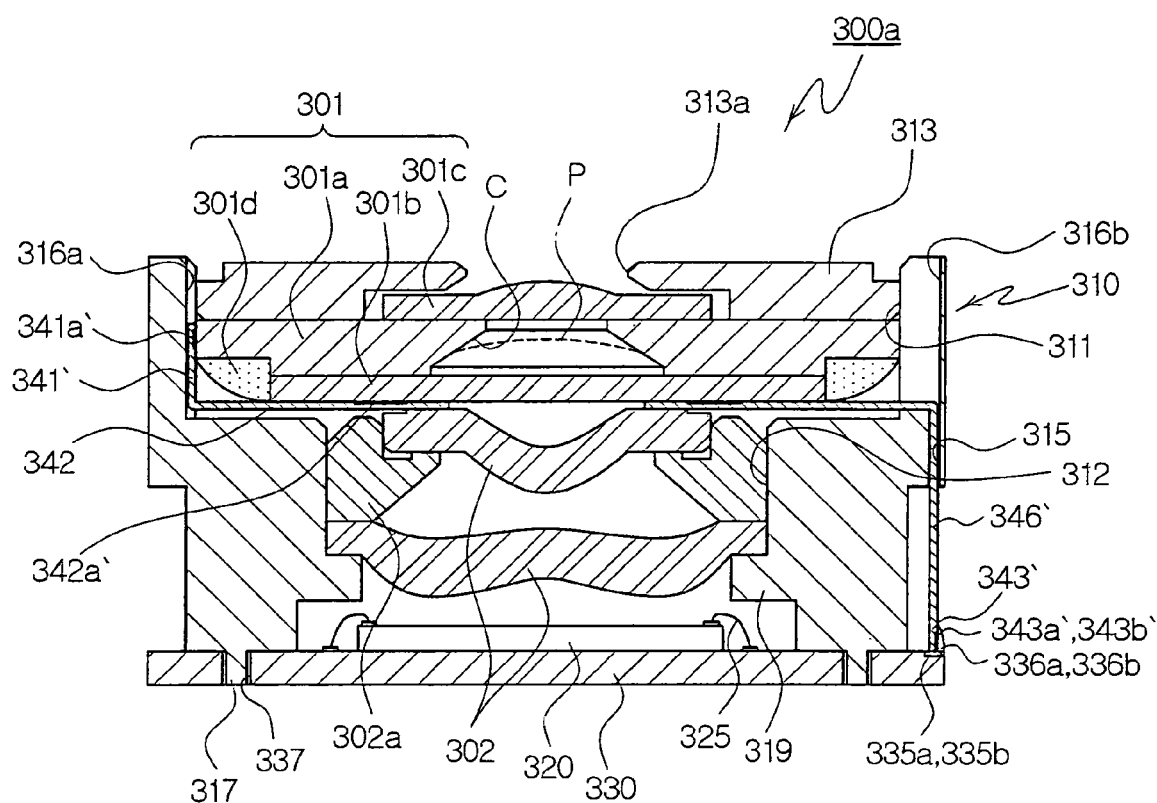
FIG. 9 is a longitudinal cross-sectional view illustrating an auto-focusing camera module having a liquid lens according to yet another exemplary embodiment of the present invention.

FIG. 9 shows an auto-focusing camera module having a liquid lens according to yet another exemplary embodiment of the present invention. Here, the flexible substrate used in the camera module 300a includes a first flexible substrate 341' stacked and disposed between an inner surface of the lens barrel 310 and an outer surface of the base 301a, a second flexible substrate 342' stacked and disposed between the solid lens 302 and the lower transparent substrate 301b provided in the base 301a, and a third flexible substrate 343' that is in contact with the substrate 330.

Figure 10B:
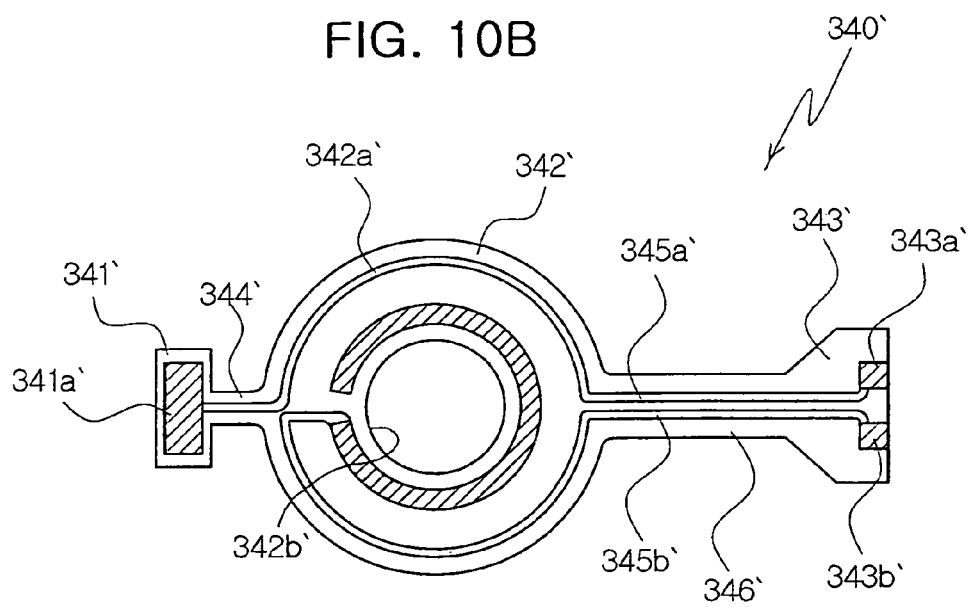

As shown in FIG. 10B, the first flexible substrate 341' has a first connection pattern 341a' printed on an outer surface thereof that corresponds to the base 301a constituting the liquid lens 301 since it has a size corresponding to the height of the outer surface of the base 301a, the second flexible substrate 342' has a second connection pattern 342a' printed thereon, the second connection pattern 342a' being in contact with a lower transparent substrate 301b, and the third flexible substrate 343' has third connection patterns 343a' and 343b' printed thereon, the third connection patterns 343a' and 343b' being in contact with terminal connecting units 335a and 335b formed in an upper surface of the substrate 330.

Here, the first connection pattern 341a' and the third connection pattern 343a' formed in one side of the third flexible substrate 343' are electrically coupled to each other through a circuit line 345a' printed on the flexible substrate, and the second connection pattern 342a' and the third connection pattern 343b' formed in the other side of the third flexible substrate 343' are electrically coupled to each other through another circuit line 345b' printed on the flexible substrate.

A first connecting flexible substrate 344' is provided between the first flexible substrate 341' and the second flexible substrate 342', a second connecting flexible substrate 346' is provided between the second flexible substrate and the third flexible substrate, and the third connection patterns 343a' and 343b' formed in the third substrate 343' are electrically coupled respectively to the terminal connecting units 335a and 335b formed in an upper surface of the substrate 330.

Also, it is shown that the first flexible substrate 341' has a higher size than a width of the first connecting flexible substrate 344a', but the present invention is not particularly limited thereto. Therefore, the first flexible substrate 341' is disposed in a substrate array groove 316a in which the first connecting flexible substrate 344' is disposed since it has the same width as or a lower width than the first connecting flexible substrate 344a'.

Figure 11A:
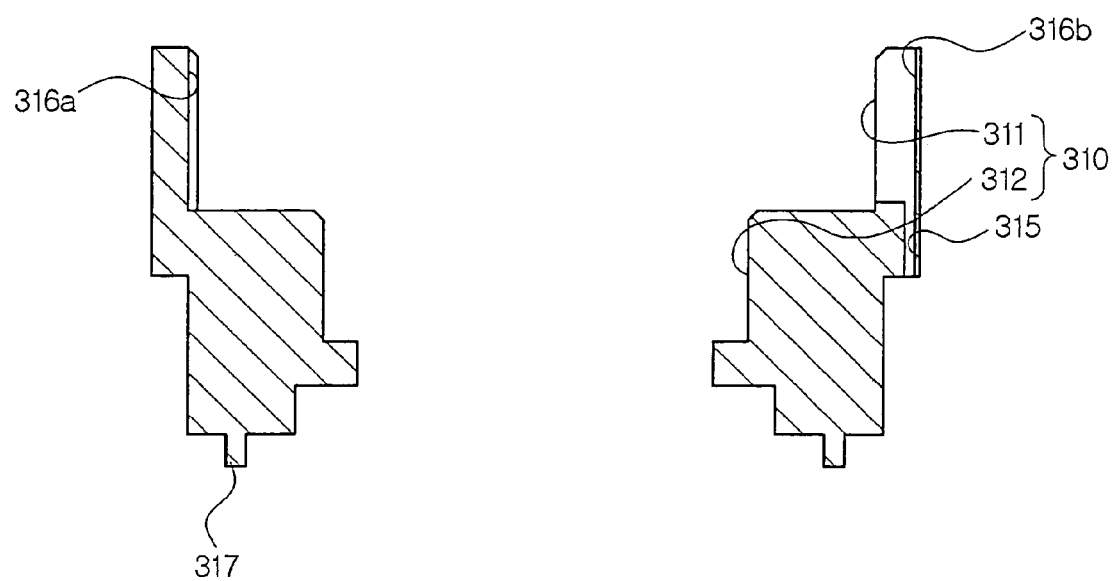
FIGS. 11A, B, C and D are assembly views illustrating operations of assembling the auto-focusing camera module having a liquid lens according to the yet another exemplary embodiment of the present invention.

As shown in FIG. 11A, an operation of assembling the camera module 300 as configured thus includes: preparing a lens barrel 310 including first and second lens receptor units 311 and 312 and forming array holes 315 and substrate array grooves 316a and 316b in the lens barrel 310.

The array holes 315 and the substrate array grooves 316a and 316b are formed in the lens barrel 310 during the injection molding of the lens barrel 310.

Figure 11B:
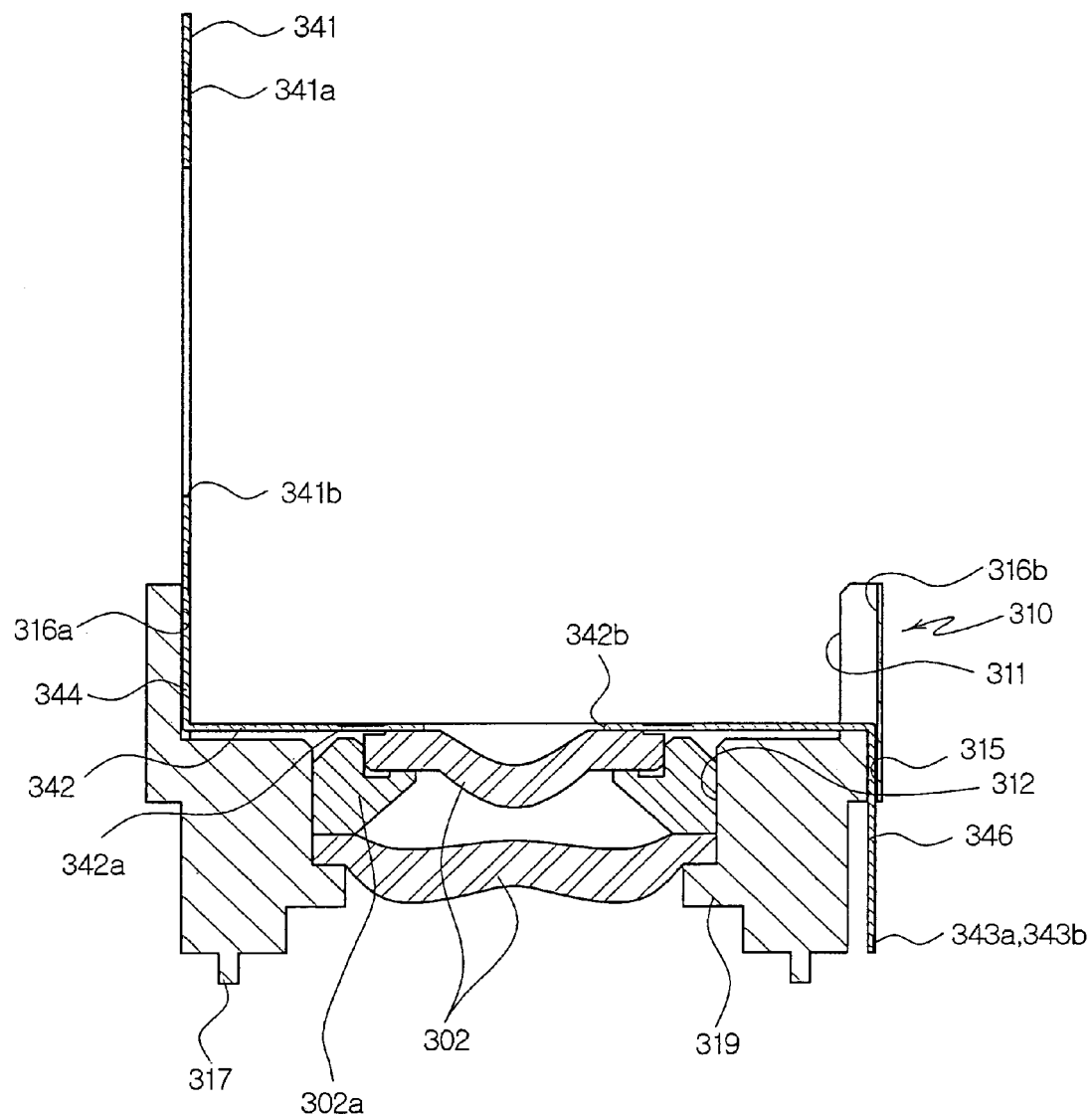

Also, an operation of disposing a solid lens 302 in the lens barrel 310 is carried out by inserting a plurality of solid lenses 302 in the lens barrel 310 in an optical axis direction, as shown in FIG. 11B. Therefore, the bottom solid lens 302 is fixed in a protrusion 319 protruded from an inner surface of the second lens receptor unit 312 with a flat portion of the bottom solid lens 302 being in contact with the protrusion 319, and the other solid lenses adjacent to the solid lens are stacked and disposed by means of a spacer 302a.

When the solid lens 302 is completely disposed in the second lens receptor unit 312, a flexible substrate including second and third substrates is disposed right on the lens barrel 310.

In this case, a lower end of the third flexible substrate 343 is inserted into the array hole 315 while being guided and inserted along a lead array groove 316b formed in the lens barrel 310, and therefore the lower end of the third flexible substrate 343 is exposed to the outside environment. Also, the second flexible substrate 342 remaining inside the lens barrel 310 is bent at an angle of 90° toward the solid lens 302, that is, the left side of FIG. 11A, and therefore one side of the second flexible substrate 342 is in contact with the top solid lens 302, a second connection pattern 342a formed in the other side of the second flexible substrate 342 is exposed upward, and an outer rim of the second flexible substrate 342 is in contact with the inner surface of the lens barrel 310.

Here, the throughhole 342b formed in the second flexible substrate 342 coincides with an optical axis that is passed through the center of the solid lens 302.

Subsequently, the first connecting flexible substrate 344 coupling the first flexible substrate 341 to the second flexible substrate 342 is disposed in a substrate array groove 316a concavely formed in the lens barrel, and the first flexible substrate 341 maintains a vertically bent state by bending the first flexible substrate 341 at an angle of 90° toward the inner side of the lens barrel relative to the second flexible substrate 342, that is, the right side of FIG. 11A.

Figure 11C:
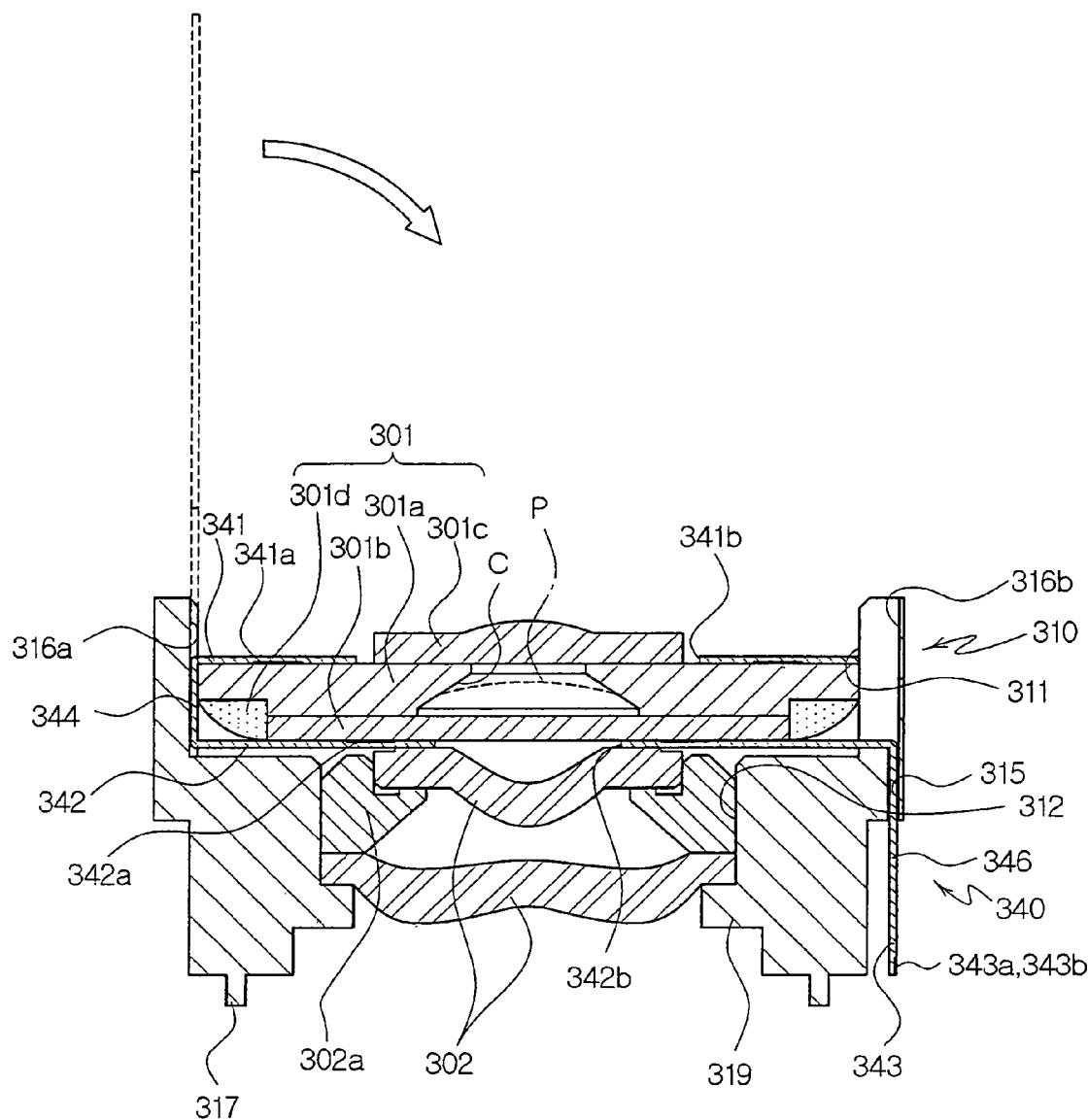

Also, an operation of disposing a liquid lens 301 in the lens barrel 310 is carried out by inserting a liquid lens 301 into the lens barrel 310 and stacking and disposing the liquid lens 301 in the first lens receptor unit 311, the liquid lens 101 including a base 301a and upper and lower transparent substrates 301c and 301b and a cavity (C) of the base 301a being filled with an electrolyte solution and a dielectric fluid, as shown in FIG. 11C.

In this case, the lower transparent substrate 301b of the liquid lens 301 is in contact with the second connection pattern 342a of the second flexible substrate 342, and therefore the second substrate 342 is stacked and disposed between the lower transparent substrate 301b of the liquid lens 301 and the top solid lens 302.

Subsequently, when the first flexible substrate 341 extended from the second flexible substrate 342 is bent at an angle of 90° toward the liquid lens as shown in FIG. 11C after the liquid lens 301 is completely disposed in the first lens receptor unit 311, the first flexible substrate 341 is in contact with an outer surface of the base 301a, wherein the first flexible substrate 341 has a throughhole 341b formed through, the throughhole 341b having a higher size than an external diameter of the upper transparent substrate 301c.

Also, the first connection pattern 341a formed in the first flexible substrate 341 is in contact with an upper surface of the base 301a.

Figure 11D:
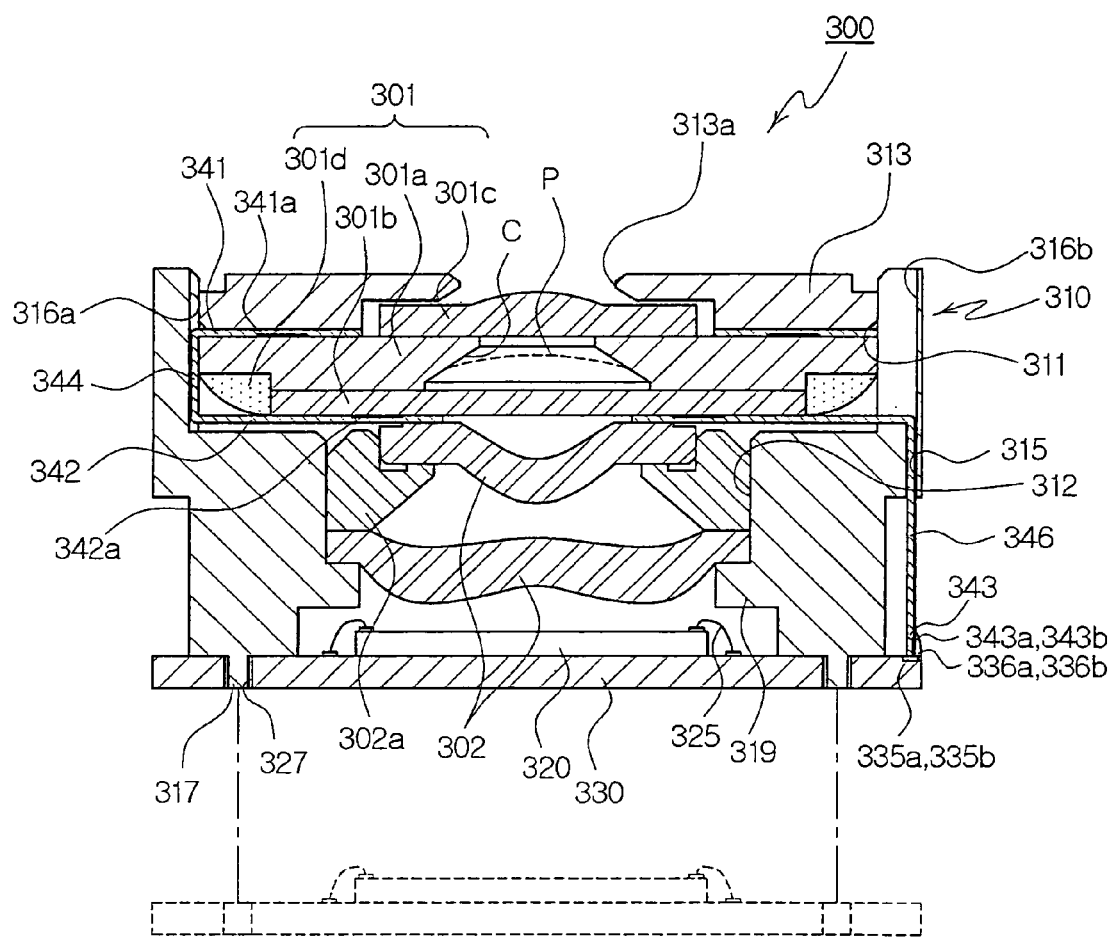

Also, the separation of the liquid lens 301 inserted and disposed in the first lens receptor unit 311 of the lens barrel 310 is prevented and a bent state of the first flexible substrate 341 is maintained by assembling and fixing an upper cap 313 in an upper portion of the lens barrel 310, the upper cap 213 being formed in a central region of the lens barrel 310 and having an incidence hole 313a formed therethrough, as shown in FIG. 11D.

In this case, the first flexible substrate 341 is stacked and disposed between a lower surface of the upper cap 313 and the base 301a of the liquid lens 301, and the first connection pattern 341a formed in the first flexible substrate 341 maintains the contact with the base 301a.

Subsequently, an operation of assembling the lens barrel 310 and the substrate 330 is carried out by inserting a position fixing pin 317 formed in a lower end of the lens barrel into a position fixing hole 337 formed in the substrate 330 when the lens barrel 310 in which the liquid lens 301 and the solid lens 302 are disposed is used as an upper part and the substrate 330 in which an image sensor 320 is mounted is used as a lower part, and the lens barrel 310 and the substrate 330 are disposed up and down relative to each other.

In this case, the third connection patterns 343a and 343b of the third flexible substrate 342, which is exposed to the outside of the lens barrel 310 and extended along an outer surface of the lens barrel 310, correspond respectively to the terminal connecting units 335a and 335b formed in an upper surface of the substrate 330.

Therefore, the third connection pattern 343a and 343b are electrically coupled respectively to the terminal connecting units 335a and 335b by means of the solders 336a and 336b, or electrically coupled respectively to the terminal connecting units 335a and 335b through the insertion into connectors (not shown) formed in the terminal connecting units 335a and 335b.

And, the lens barrel 310 and the substrate 330 are assembled up and down relative to each other by bonding the lower end of the lens barrel 310 to the upper surface of the substrate 330 by means of a bonding agent that is coated onto an outer rim of the substrate 330, and therefore the assembly of the auto-focusing camera module 300 is completed.

When a power source is applied to the prepared auto-focusing camera modules 100, 200, 300 and 300a through the terminal connecting units provided in the substrates 130, 230 and 330 as described above, an electric current is supplied to the bases and the lower transparent substrates of the liquid lenses 101, 201 and 301 through the power supply units 140, 240 and 340 connected with the terminal connecting units, and the electric current flows in the electrolyte solution with which the cavity (C) of the base is filled.

Therefore, the focal distances between the liquid lenses 101, 201 and 301 and the image sensors 120, 220 and 320 may be easily controlled by changing a curvature in the interface (P) between the dielectric fluid and the electrolyte solution by the presence of the equilibrium wetting condition of the interface (P) when an electro-wetting phenomenon occurs due to the change in surface tension of the electrolyte solution.

According the present invention, the focal distance between the lens and the image sensor may be easily controlled by coupling the liquid lens to the substrate to apply a power source to the liquid lens since the power supply unit is integrally provided in the lens barrel in which the liquid lens and the solid lens are disposed, or is disposed or foldedly disposed in the array hole, as described above. Accordingly, the auto-focusing camera module according to the present invention may be useful to control its focus to coincide with high pixels and high performances of the camera module, reduce a volume of a final product by lowering the entire height of the camera module, enhance the productivity of the camera module by simplifying an assembly structure of the liquid lens that is in contact with the substrate, and reduce the manufacturing cost.

While the present invention has been shown and described in connection with the exemplary embodiments, it will be apparent to those skilled in the art that modifications and variations can be made without departing from the spirit and scope of the invention as defined by the appended claims.

What is claimed is:

1. An auto-focusing camera module having a liquid lens, comprising:
   a lens barrel having a liquid lens and a solid lens stacked and disposed therewith;
   an image sensor to focus light that is passed through the liquid lens and the solid lens;
   a substrate, provided in a lower end of the lens barrel, to electrically mount the image sensor; and
   a power supply unit, fixed integrally in the lens barrel and electrically coupled between the liquid lens and the substrate, to apply a power source to the liquid lens, wherein the power supply unit includes first and second leads whose upper ends are disposed adjacent and electrically coupled to the liquid lens, the upper end being exposed through an inner surface of the lens barrel, and whose lower ends are electrically coupled to the substrate, the lower end being exposed to the outside of the lens barrel.

2. The auto-focusing camera module of claim 1, wherein the upper end of the first lead is in contact with a base constituting the liquid lens and the lower end of the first lead is in contact with the substrate, and the upper end of the second lead is in contact with a lower transparent substrate that is coupled to a lower surface of the base and the lower end of the second lead is in contact with the substrate.

3. The auto-focusing camera module of claim 1, wherein each of the first and second leads includes a vertical body formed integrally to the lens barrel, and an elastic contact unit obliquely bended toward the liquid lens to be in elastic contact with the liquid lens.

4. The auto-focusing camera module of claim 3, wherein the elastic contact units of the first and second leads are disposed respectively in first and second exposure regions formed in the inner surface of the lens barrel.

5. The auto-focusing camera module of claim 1, wherein the lower ends of the first and second leads are in contact with terminal connecting units of the substrate by means of solders.

6. The auto-focusing camera module of claim 1, wherein the lower ends of the first and second leads are in contact with the terminal connecting units of the substrate by means of connectors that is provided in the terminal connecting units of the substrate.

7. The auto-focusing camera module of claim 1, wherein the lens barrel includes a first receptor unit having the liquid lens disposed therein, and a second receptor unit having the solid lens disposed therein.

8. The auto-focusing camera module of claim 1, wherein the upper end of the lens barrel is provided with an upper cap having an incidence hole formed therethrough.

9. An auto-focusing camera module having a liquid lens, comprising:
   a lens barrel having a liquid lens and a solid lens stacked and disposed therewith;

an image sensor to focus light that is passed through the liquid lens and the solid lens;

a substrate, provided in a lower end of the lens barrel, to electrically mount the image sensor; and a power supply unit, inserted and disposed in an array hole passed vertically through a body of the lens barrel and electrically coupled between the liquid lens and the substrate, to apply a power source to the liquid lens, wherein the power supply unit includes first and second leads whose upper ends are disposed adjacent and electrically coupled to an outer surface of the liquid lens, the upper end being partially exposed through an inner surface of the lens barrel, and whose lower ends are electrically coupled to the substrate, the lower end being exposed to the outside of the lens barrel.

10. The auto-focusing camera module of claim 9, wherein the upper end of the first lead is in contact with an upper surface of a base constituting the liquid lens and the lower end of the first lead is in contact with the substrate, and the upper end of the second lead is in contact with a lower surface of a lower transparent substrate that is coupled to a lower surface of the base and the lower end of the second lead is in contact with the substrate.

11. The auto-focusing camera module of claim 9, wherein each of the first and second leads includes a vertical body inserted and disposed in the array hold, and a horizontal body bended at an angle of 90° from the upper end of the vertical body toward the liquid lens to be in contact with an outer surface of the liquid lens.

12. The auto-focusing camera module of claim 11, wherein the array hole is coupled to a lead array groove concavely formed in the inner surface of the lens barrel.

13. The auto-focusing camera module of claim 11, wherein the horizontal body of the first lead is stacked and disposed between the liquid lens and an upper cap assembled into the lens barrel.

14. The auto-focusing camera module of claim 11, wherein the horizontal body of the first lead includes a throughhole having a higher size than the upper transparent substrate constituting the liquid lens.

15. The auto-focusing camera module of claim 11, wherein the horizontal body of the second lead is stacked and disposed between the liquid lens and the solid lens.

16. The auto-focusing camera module of claim 11, wherein the horizontal body of the second lead includes a throughhole having a higher size than effective diameters of the liquid lens and the solid lens.

17. The auto-focusing camera module of claim 9, wherein the lower ends of the first and second leads are in contact with terminal connecting units of the substrate by means of solders.

18. The auto-focusing camera module of claim 9, wherein the lower ends of the first and second leads are in contact with the terminal connecting units of the substrate by means of connectors that are provided in an upper surface of the substrate.

19. The auto-focusing camera module of claim 9, wherein the lens barrel includes a first receptor unit having the liquid lens disposed therein, and a second receptor unit having the solid lens disposed therein.

20. The auto-focusing camera module of claim 9, wherein the upper end of the lens barrel is provided with an upper cap having an incidence hole formed therethrough.

21. An auto-focusing camera module having a liquid lens, comprising:

a lens barrel having a liquid lens and a solid lens stacked and disposed therewith;

an image sensor to focus light that is passed through the liquid lens and the solid lens;

a substrate provided in a lower end of the lens barrel to electrically mount the image sensor; and a power supply unit inserted and disposed in an array hole passed vertically through a body of the lens barrel, foldedly disposed between the liquid lens and the solid lens, and electrically coupled between the liquid lens and the substrate to apply a power source to the liquid lens.

22. The auto-focusing camera module of claim 21, wherein the power supply unit includes a flexible substrate whose outer surface is provided with first and second connection patterns, the outer surface being in opposing contact with the liquid lens, and whose lower end is electrically coupled to the substrate, the lower end being exposed to the outside of the lens barrel through the array hole.

23. The auto-focusing camera module of claim 22, wherein the flexible substrate includes a first substrate having a first connection pattern printed therein, the first connection pattern being in contact with the base constituting the liquid lens; a second flexible substrate having a second connection pattern printed therein, the second connection pattern being in contact with the lower transparent substrate constituting the base; and a third flexible substrate having a third connection pattern printed therein, the third connection pattern being electrically coupled to the substrate, wherein the first, second and third connection patterns is coupled through circuit lines printed on the flexible substrate.

24. The auto-focusing camera module of claim 23, wherein a first connecting flexible substrate is provided between the first flexible substrate and the second flexible substrate, the first connecting flexible substrate being disposed in the substrate array groove concavely formed in the inner surface of the lens barrel, and second connecting flexible substrate is provided between the second flexible substrate and the third flexible substrate, the second connecting flexible substrate being inserted and disposed in another array hole formed through the lens barrel.

25. The auto-focusing camera module of claim 24, wherein the array hole in which the second connecting flexible substrate is inserted and disposed is coupled to another substrate array groove concavely formed in the inner surface of the lens barrel.

26. The auto-focusing camera module of claim 23, wherein the first flexible substrate is stacked and disposed between an upper surface of the base and the upper cap assembled onto the lens barrel.

27. The auto-focusing camera module of claim 23, wherein the second flexible substrate is stacked and disposed between the solid lens and a lower surface of the lower transparent substrate provided in the base.

28. The auto-focusing camera module of claim 23, wherein the first flexible substrate and the second flexible substrate have the same size as an inner diameter of the lens barrel.

29. The auto-focusing camera module of claim 23, wherein the first flexible substrate includes a throughhole having a higher size than the upper transparent substrate constituting the liquid lens.

30. The auto-focusing camera module of claim 23, wherein the second flexible substrate includes a throughhole having a higher size than effective diameters of the liquid lens and the solid lens.

31. The auto-focusing camera module of claim 23, wherein the first flexible substrate is stacked and disposed between the inner surface of the lens barrel and the outer surface of the base.

32. The auto-focusing camera module of claim 23, wherein the first substrate is disposed in the substrate array groove formed in the inner surface of the lens barrel.

33. The auto-focusing camera module of claim 23, wherein the third connection pattern of the third flexible substrate is in contact with the terminal connecting unit of the substrate by means of a solder.

34. The auto-focusing camera module of claim 23, wherein the third connection pattern of the third flexible substrate is in contact with the terminal connecting unit of the substrate by means of a connector provided in the terminal connecting unit of the substrate.

35. The auto-focusing camera module of claim 21, wherein the lens barrel includes a first receptor unit having the liquid lens disposed therein, and a second receptor unit having the solid lens disposed therein.

36. The auto-focusing camera module of claim 21, wherein the upper end of the lens barrel is provided with an upper cap having an incidence hole formed therethrough.

* * * * *